US012647915B2

(12) United States Patent (10) Patent No.: US 12,647,915 B2
Patchava et al. (45) Date of Patent: Jun. 2, 2026

(54) TAG SIGNALING FOR SELECTIVE BEAM SWEEPING

(71) Applicant: Qualcomm Incorporated, San Diego, CA (US)

(72) Inventors: Raviteja Patchava, San Diego, CA (US); Piyush Gupta, Bridgewater, NJ (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/534,449

(22) Filed: Dec. 8, 2023

(65) Prior Publication Data

US 2025/0193812 A1 Jun. 12, 2025

(51) Int. Cl.
*H04W 56/00* (2009.01)
*H04B 7/06* (2006.01)
*H04B 17/318* (2015.01)
*H04W 74/0833* (2024.01)

(52) U.S. Cl.
CPC .... *H04W 56/0015* (2013.01); *H04B 7/06952* (2023.05); *H04B 17/328* (2023.05); *H04W 74/0833* (2013.01)

(58) Field of Classification Search
None
See application file for complete search history.

(56) References Cited

U.S. PATENT DOCUMENTS

2020/0412425 A1 * 12/2020 Laghate .............. H04B 7/0695
2023/0254886 A1 8/2023 Gupta et al.
2023/0283442 A1 9/2023 Wang et al.
2025/0293738 A1 * 9/2025 Li ..................... H04W 74/0833

* cited by examiner

*Primary Examiner* — Hong S Cho
(74) *Attorney, Agent, or Firm* — Dinsmore & Shohl LLP

(57) ABSTRACT

Certain aspects of the present disclosure provide techniques for wireless communication by an apparatus. A method includes receiving a synchronization signal, the synchronization signal including timing information associated with a directional beam sweep procedure, and power threshold information indicating beam power criteria evaluated during the directional beam sweep procedure; receiving, from the directional beam sweep, a first directional beam in accordance with the timing information, the first directional beam providing radio frequency energy for energy harvesting by the apparatus; measuring an amount of power associated with the first directional beam; comparing the measured amount of power to the power threshold information; and providing a feedback signal, wherein the contents of the feedback signal are based on the comparison with the power threshold information associated with the directional beam sweep.

30 Claims, 16 Drawing Sheets

RFIC Received Power, P, (dBm)

Separation Distance, r (m)

Friis Link Budget

RFIC Threshold

On Cardboard
with Multipath

On Aluminum
with Multipath

BS
702

ER
704

ER
706

708A

708B

750

700

710

712

714

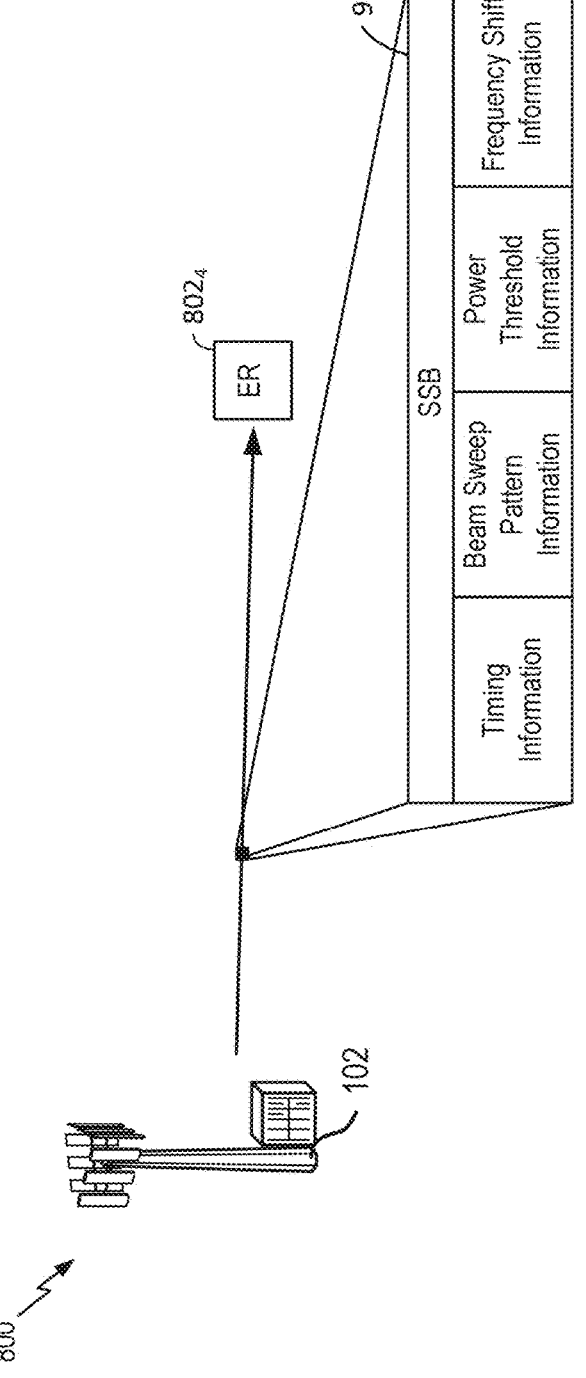
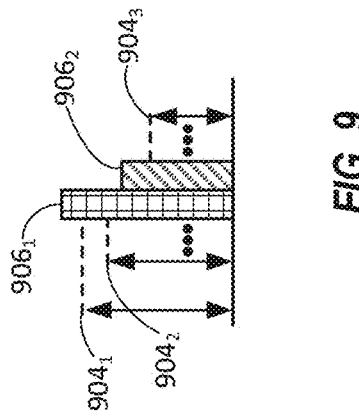
*FIG. 9*

1300

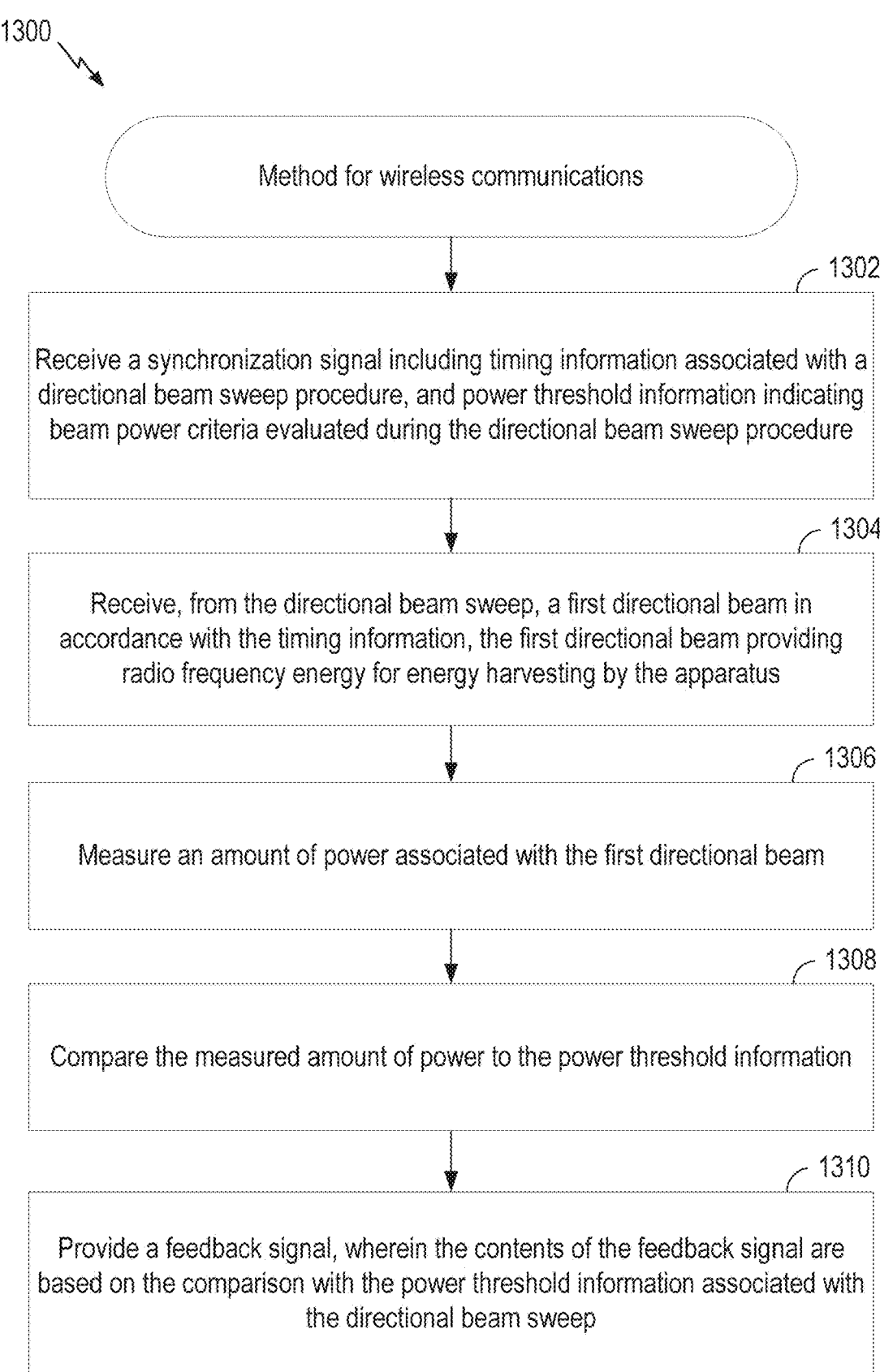

Method for wireless communications

1302

Receive a synchronization signal including timing information associated with a directional beam sweep procedure, and power threshold information indicating beam power criteria evaluated during the directional beam sweep procedure

1304

Receive, from the directional beam sweep, a first directional beam in accordance with the timing information, the first directional beam providing radio frequency energy for energy harvesting by the apparatus

1306

Measure an amount of power associated with the first directional beam

1308

Compare the measured amount of power to the power threshold information

1310

Provide a feedback signal, wherein the contents of the feedback signal are based on the comparison with the power threshold information associated with the directional beam sweep

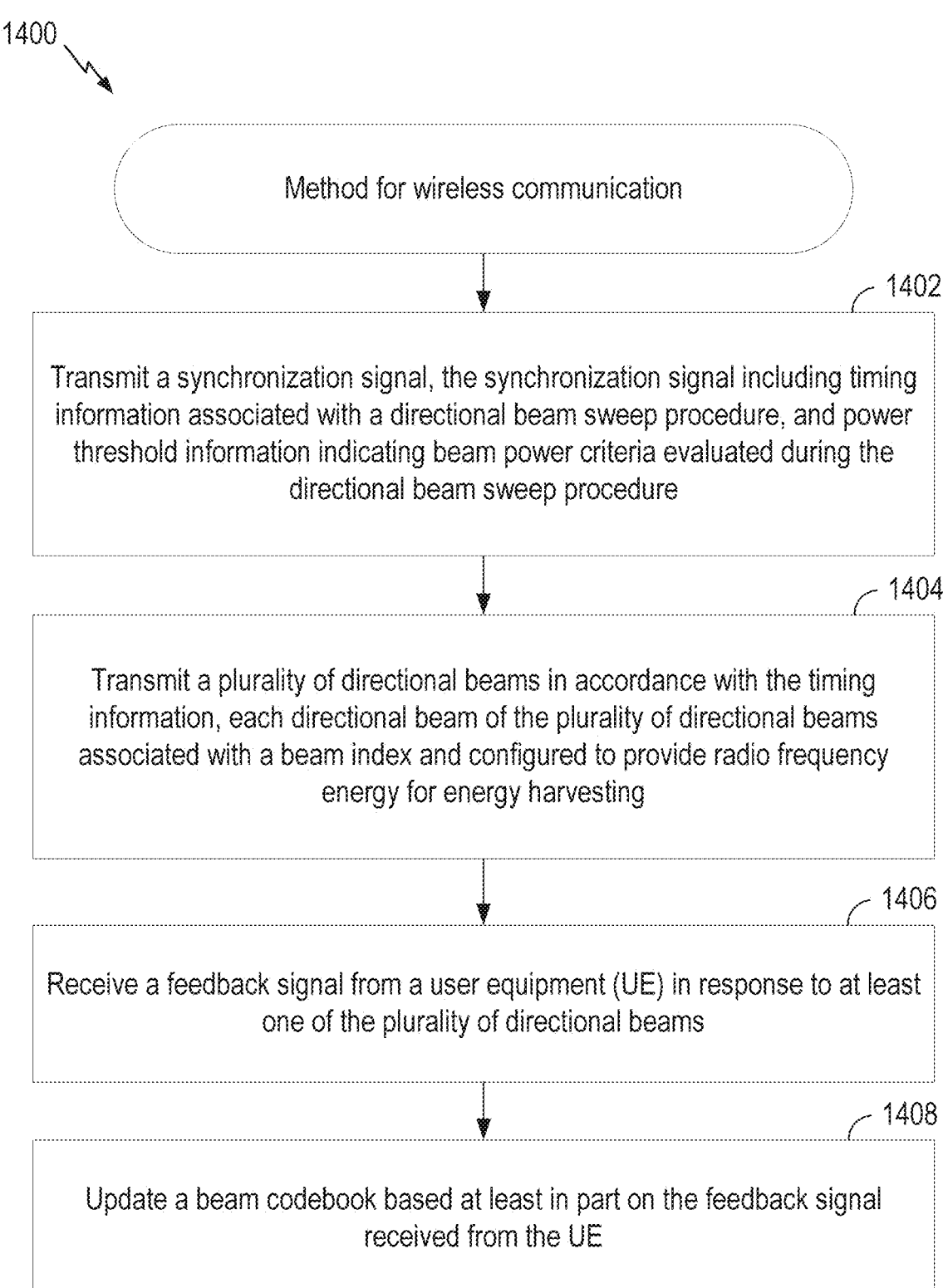

Method for wireless communication

1402

Transmit a synchronization signal, the synchronization signal including timing information associated with a directional beam sweep procedure, and power threshold information indicating beam power criteria evaluated during the directional beam sweep procedure

1404

Transmit a plurality of directional beams in accordance with the timing information, each directional beam of the plurality of directional beams associated with a beam index and configured to provide radio frequency energy for energy harvesting

1406

Receive a feedback signal from a user equipment (UE) in response to at least one of the plurality of directional beams

1408

Update a beam codebook based at least in part on the feedback signal received from the UE

*FIG. 14*

TAG SIGNALING FOR SELECTIVE BEAM SWEEPING

INTRODUCTION

Field of the Disclosure

Aspects of the present disclosure relate to wireless communications, and more particularly, to techniques for detecting and locating energy receivers to provide wireless power transfer.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by an apparatus. The method includes receiving a synchronization signal, the synchronization signal include timing information associated with a directional beam sweep procedure, and power threshold information indicating beam power criteria evaluated during the directional beam sweep procedure; receiving, from the directional beam sweep, a first directional beam in accordance with the timing information, the first directional beam providing radio frequency energy for energy harvesting by the apparatus: measuring an amount of power associated with the first directional beam; comparing the measured amount of power to the power threshold information; and providing a feedback signal, wherein the feedback signal indicates whether the measured amount of power exceeds the power threshold information obtained from the synchronization signal.

Another aspect provides a method for wireless communication by an apparatus. The method includes transmitting a synchronization signal, the synchronization signal including timing information associated with a directional beam sweep procedure, and power threshold information indicating beam power criteria evaluated during the directional beam sweep procedure: transmit a plurality of directional beams in accordance with the timing information, each directional beam of the plurality of directional beams associated with a beam index and configured to provide radio frequency energy for energy harvesting: receive a feedback signal from a user equipment (UE) in response to at least one of the plurality of directional beams; and update a beam codebook based at least in part on the feedback signal received from the UE.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 9 illustrates a diagram with additional details associated with providing a beam in a direction of an energy receiver.

FIG. 13 depicts a method for wireless communications.

FIG. 14 depicts another method for wireless communications.

DETAILED DESCRIPTION

Figure 1:
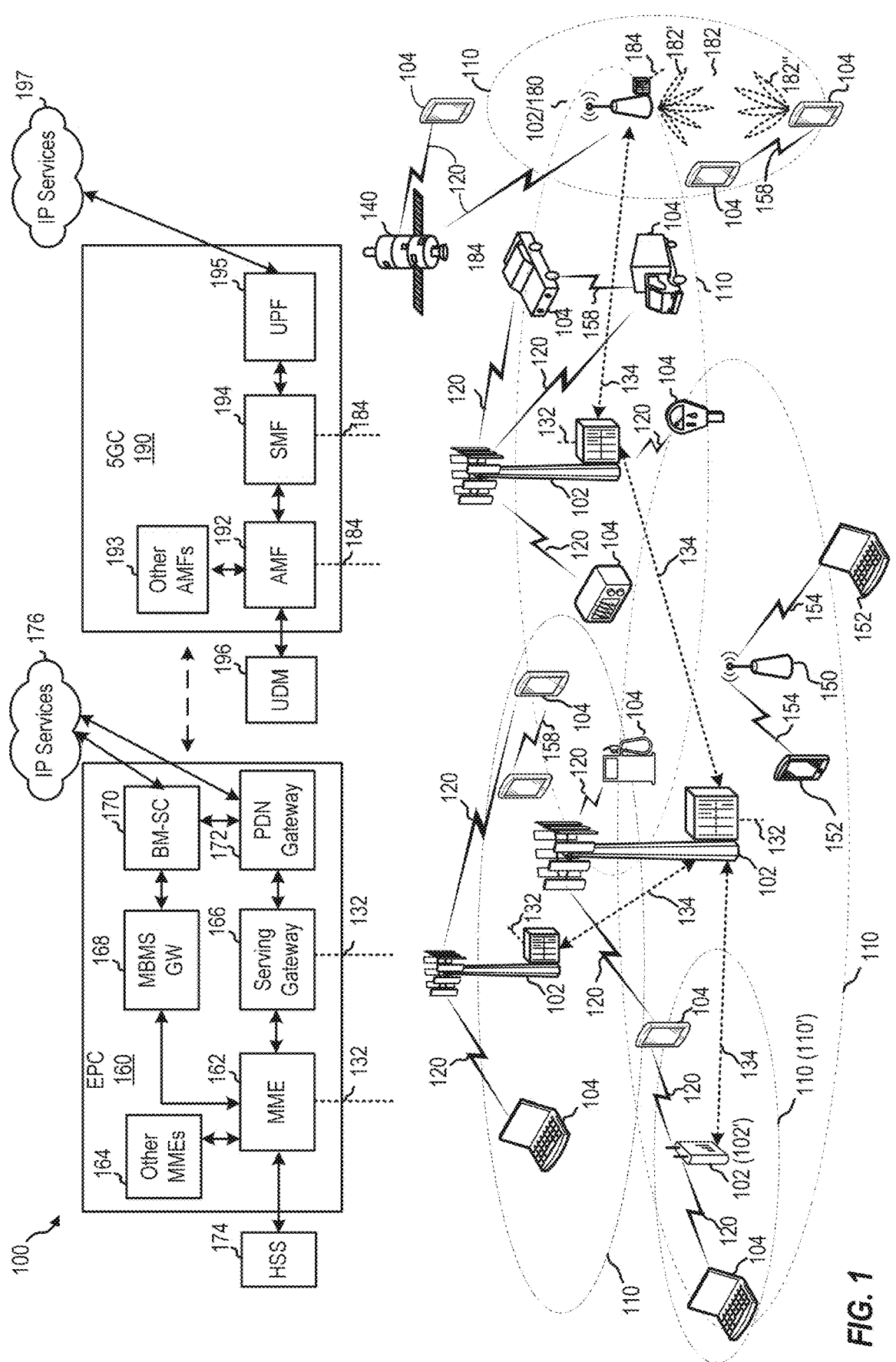
FIG. 1 depicts an example wireless communications network.

Aspects of the present disclosure provide apparatuses, methods, processing systems, and computer-readable mediums for detecting and locating devices that are not covered by a network entity's current beam codebook in order to provide wireless power transfer.

Wireless power transfer is used to provide energy to energy receiving devices, like radio frequency identification (RFID) tags and IoT sensors. A network entity can transmit focused Radio Frequency (RF) signals that are harvested by power harvesting circuitry of the energy receiving device. However, energy receiving devices have limited communication range due in part to the need to harvest energy from the RF signals. For example, power harvesting circuitry is generally activated upon receiving an input power of around −10 to −20 dBm. This is greater than the received power used for communications, which can be −70 to −80 dBm.

One way to increase the operating range for wireless power transfer is for the network entity to use beamforming to focus energy towards the energy receiving devices. However, estimating the channel for each individual energy receiving device does not scale well when there are many energy receiving devices. Thus, some network entities perform a beam sweep operation, based on a beam codebook, which allows the energy receiving devices to backscatter in the direction of each received beam. That is, a beam codebook, can refer to a set of predefined beamforming patterns or directions that a network entity can use to communicate with devices and/or provide power to energy receiving devices. The network entity can detect the backscattered signals and estimate a number of energy receiving devices in each direction. The network entity can then schedule power transfer to the beams determined to cover energy receiving devices.

However, in order to perform the above operation, the network entity would need to sweep all possible beams for each beam sweep operation, which incurs a great amount of network overhead in terms of time, power, and processing. In some aspects, the network entity may reduce the amount of beams in a beam sweep operation using side information, such as energy receiving device location information obtained from previous beam sweep operations. However, the side information and beam codebooks may not cover new energy receiving devices entering the system.

In accordance with examples of the present disclosure, an energy receiving device can be configured to signal the network entity upon receiving a beam of a beam sweep operation, and the signal may include an indication of a power measurement as measured by the energy receiving device. This allows the network entity to update its beam codebook according to energy receiving devices within each beam and/or an associated received power level for each energy receiving device. In certain aspects, the energy receiving device can perform backscattering using a frequency shift or sequence to indicate an amount of power measured by the energy receiving device. In certain aspects, when an amount of power provided by a beam is unable to activate power harvesting circuitry, the energy receiving device can utilize a form of uplink communication and/or perform signaling using a random access procedure; in such examples, a power storage device, such as a battery or capacitor, may provide power to perform the uplink communication and/or perform signaling using the random access procedure. In certain aspects, an energy receiving device may measure an amount of power received for each beam of a beam sweep operation, compare the measured amount of power to one or more thresholds, and apply different frequency shifts based on the measured amount of power and/or whether one or more thresholds were exceeded. The energy receiving device may also indicate the best beam index to further refine the beam codebook of the network entity.

Energy receiving devices can signal the network entity by modulating and backscattering the downlink signals received during a beam sweep operation. Backscatter modulation allows the energy receiving devices to reflect the incoming RF signals in a way that encodes information and provides signaling capability to the network entity. Backscattering the response signal provides a low power method for the energy receiving devices to communicate information back to the network entity.

In some aspects, the backscattered response signal from the energy receiving device may be frequency shifted compared to the original downlink beam frequency. The frequency offset or shift allows the backscattered signal to be differentiated from the original downlink signal. Beneficially, in some aspects, the amount of frequency shift applied by the energy receiver can indicate a power measurement for the received beam. For example, the backscatter response may have different frequency shifts $\Delta f1$, $\Delta f2$, $\Delta f3$ etc. depending on the measured power level. The network entity can be configured to detect these different frequency shifts to isolate and decode the backscattered response from each energy receiving device. The frequency shift information can, in some aspects, be predetermined and known by both the network entity and energy receivers.

By tuning its receiver to the expected frequency offsets, the network entity can determine energy receivers that are present in each beam direction based on the backscatter responses. The frequency shifts may directly indicate measured power levels or beam strengths. This allows the network entity to estimate the location of energy receivers and adapt its beam sweeping and power transfer beams appropriately.

Without discovery and localization mechanisms, out-of-coverage devices cannot indicate their presence. Such devices may remain unpowered as the beams provided by the network entity are unable to reach the devices and therefor, unable to power the devices. There is a need for technical solutions to detect and locate devices that are outside a network entity's current beam codebook in order to provide wireless power transfer.

In certain aspects, solutions for discovering and locating energy receiving devices that are outside the existing beam codebook of a network entity are described. The network entity can transmit synchronization signals with timing, beam sweep, threshold, and/or frequency information to enable the energy receiving devices to measure received beam power and respond with backscatter signals indicating the amount of power received. By shifting the backscatter frequency based on the received power measurements, the energy receiving devices can inform the network entity of their location to be incorporated into the beam codebook. This provides an efficient technical method to detect and locate energy receiving devices for wireless power transfer.

Further techniques involve the energy receiving devices responding to the network entity's beam sweep by backs-cattering signals, where the frequency shift of the response can indicate an amount of power measured by an energy receiving device. This allows the network entity to identify directions with energy receiving devices and adapt its beam codebook to focus energy to those newly discovered loca-tions. By leveraging configurable beam sweeping and pro-cessing of specialized backscatter signals, the network entity can provide power transfer coverage to passive and active energy receiving devices. The backscatter response provides low-power communication from the energy receiving devices to facilitate the technical beam adaptation and modification process.

Introduction to Wireless Communications Networks

The techniques and methods described herein may be used for various wireless communications networks. While aspects may be described herein using terminology com-monly associated with 3G, 4G, 5G, 6G, and/or other gen-erations of wireless technologies, aspects of the present disclosure may likewise be applicable to other communica-tions systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equip-ment (UE), a base station (BS), a component of a BS, a server, etc.). As such communications devices are part of wireless communications network 100, and facilitate wire-less communications, such communications devices may be referred to as wireless communications devices. For example, various functions of a network as well as various devices associated with and interacting with a network may be considered network entities. Further, wireless communi-cations network 100 includes terrestrial aspects, such as ground-based network entities (e.g., BSs 102), and non-terrestrial aspects (also referred to herein as non-terrestrial network entities), such as satellite 140 and transporter, which may include network entities on-board (e.g., one or more BSs) capable of communicating with other network elements (e.g., terrestrial BSs) and UEs.

In the depicted example, wireless communications net-work 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actua-tor, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communi-cations links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and mul-tiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geo-graphic area (e.g., a home)), and/or other types of cells.

Generally, a cell may refer to a portion, partition, or segment of wireless communication coverage served by a network entity within a wireless communication network. A cell may have geographic characteristics, such as a geo-graphic coverage area, as well as radio frequency charac-teristics, such as time and/or frequency resources dedicated to the cell. For example, a specific geographic coverage area may be covered by multiple cells employing different fre-quency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communica-tions, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
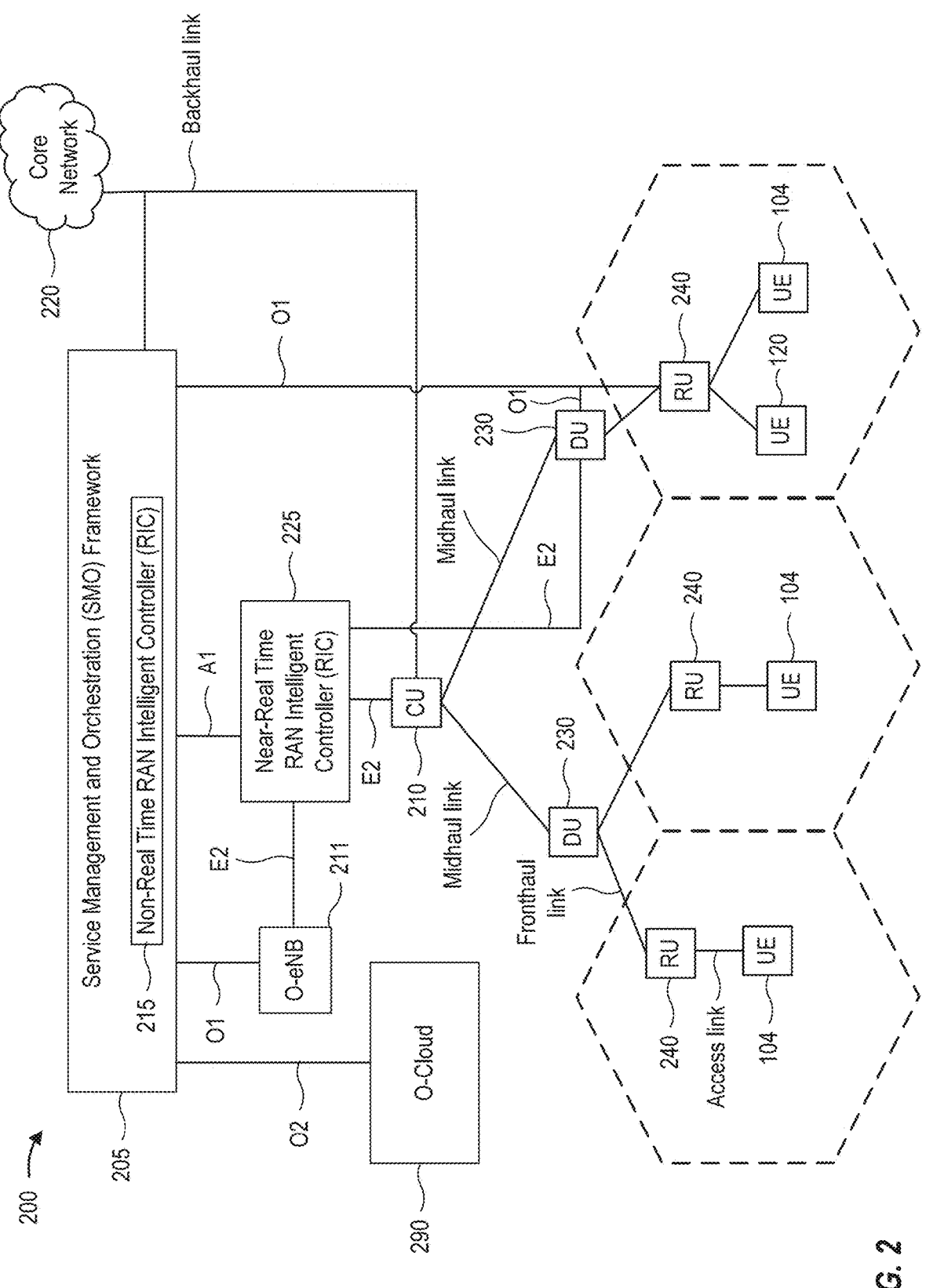
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHZ". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHz-71,000 MHz. A base station configured to communicate using mm Wave/near mm Wave radio frequency bands (e.g., a mm Wave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182". BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
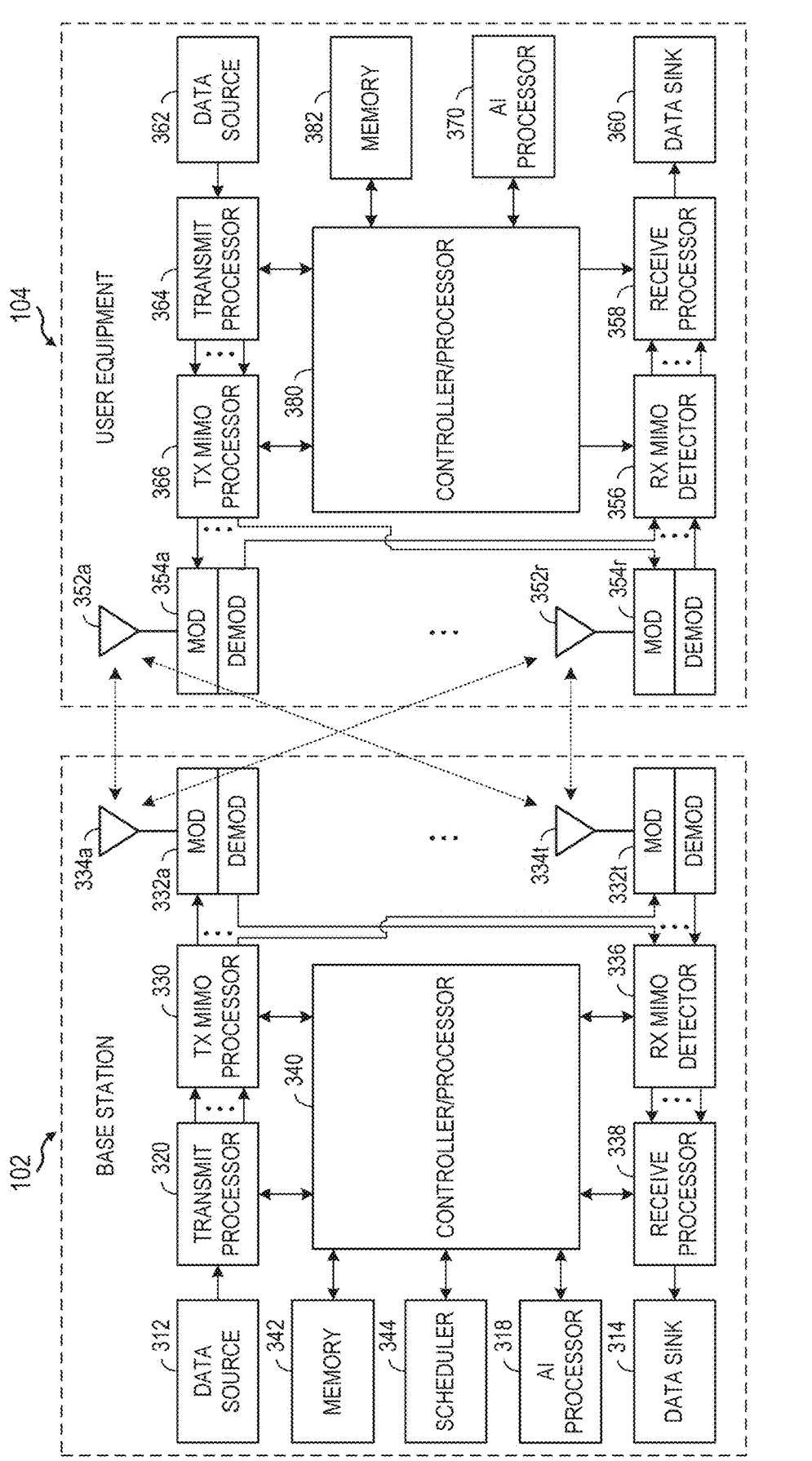
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
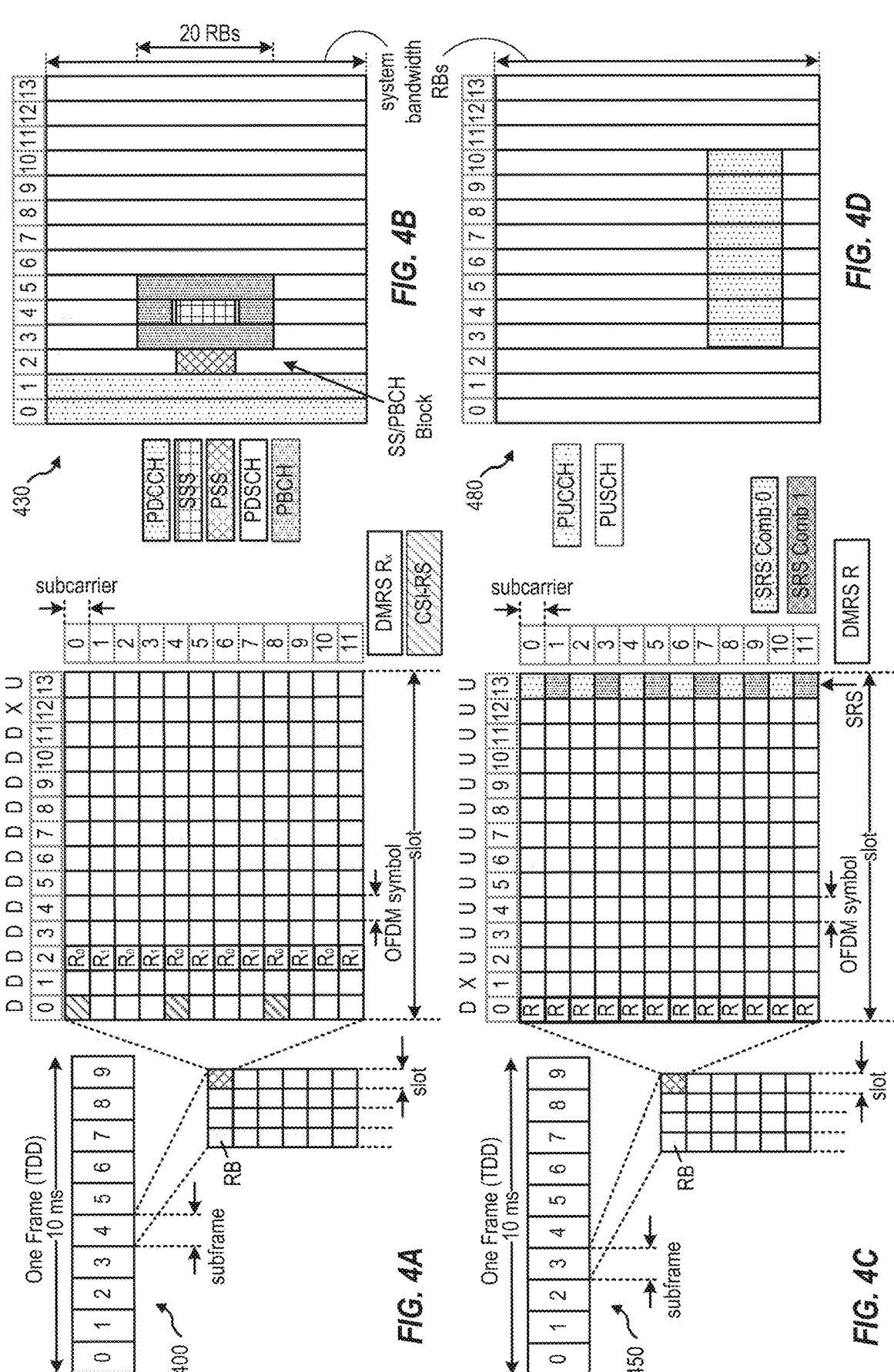
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe. FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL. U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology u, there are 24 slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu} \times 15$ kHz, where $\mu$ is the numerology 0 to 6. As an example, the numerology $\mu=0$ corresponds to a subcarrier spacing of 15 kHz, and the numerology $\mu=6$ corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu=2$ with 4 slots per subframe. In such a case, the slot duration is 0.25 ms, the subcarrier spacing is 60 KHz. and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block, also referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
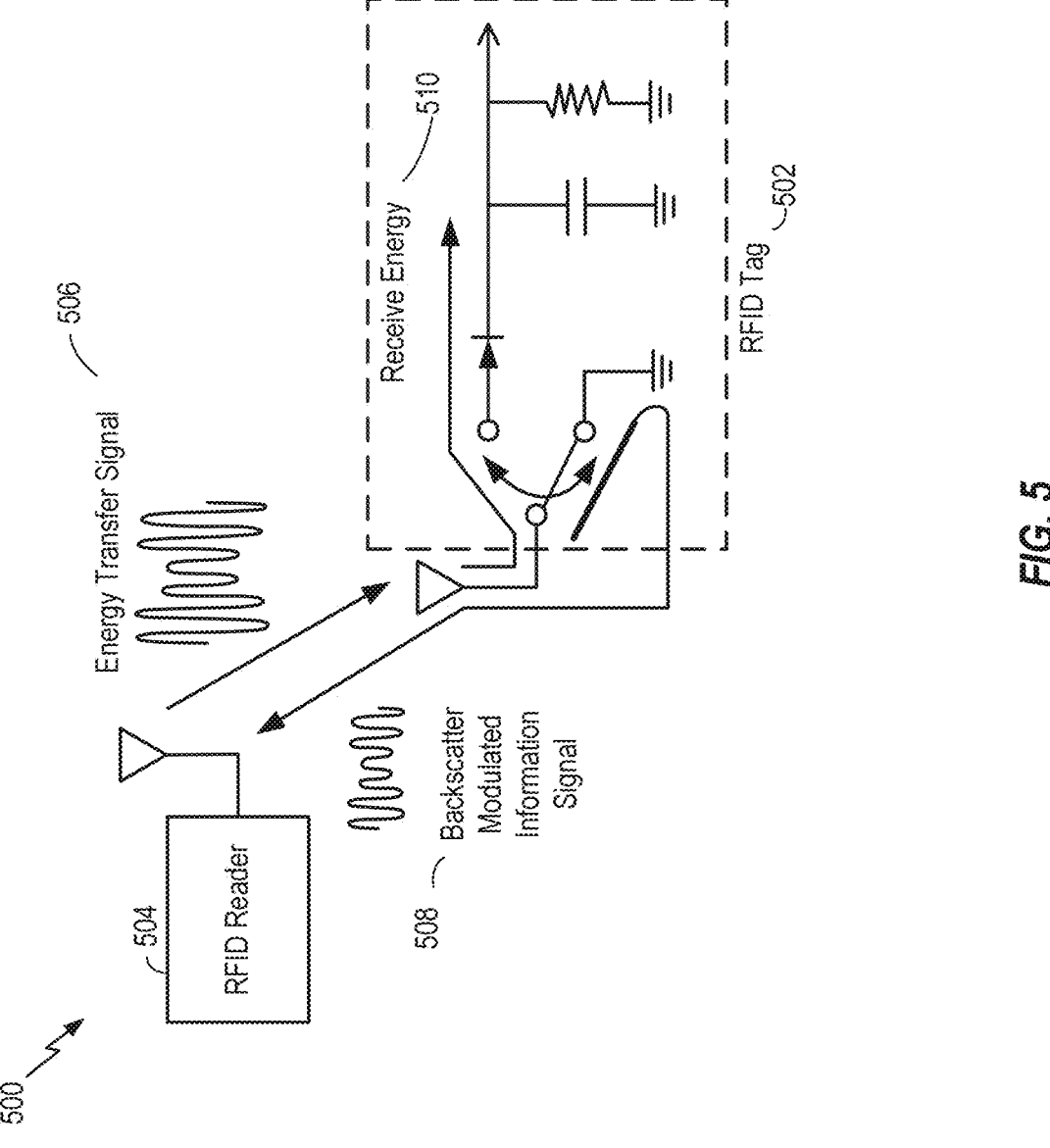
FIG. 5 illustrates a diagram of a radio frequency identification (RFID) tag that receives an energy transfer signal from an RFID reader.

Aspects Related to Detecting and Locating Energy Receivers to Provide Wireless Power Transfer FIG. 5 depicts a diagram 500 of an RFID tag 502 that receives an energy transfer signal 506 from an RFID reader 504. Such an RFID tag 502 is one example of an energy receiving device and/or a communication device, such as UE 104, that may obtain energy from an energy transfer signal. In one example, an energy transfer signal 506 may be used for various industrial IoT (IIoT) applications. For example, RFID technology may be used for inventory/asset management both inside and outside of warehouses, network sensors in factories, agricultural applications, smart homes, etc. RFID technology may also be deployed in association with cellular infrastructure for wireless applications. RFID devices may include a transponder (e.g., the RFID tag 502) that emits an information-bearing signal, such as a backscattered modulated information signal 508, upon receiving a signal from the RFID reader 504. That is, the RFID reader 504 may transmit the energy transfer signal 506 as well as an information signal to a passive RFID microchip (e.g., RFID tag 502) that operates without a battery source. In certain aspects, the RFID reader 504 is an example of a BS 180, where the RFID reader 504 transmits an energy transfer signal 506.

The RFID tag 502 may be configured to operate without the battery source. Other types of RFID tags may include battery sources. For example, semi-passive RFID devices and active RFID devices may have a battery source, but may also be associated with a higher cost and technical complexity. If the RFID reader 504 is able to provide enough received energy 510 to the RFID tag 502, the RFID tag 502 may harvest the received energy 510 to perform an operation during communication occasions or may harvest the received energy 510 to charge an associated battery. Passive RFID tags may harvest the received energy 510 over-the-air in order to power Tx/Rx circuitry at the RFID tag 502. The energy transfer signal 506 transmitted to the RFID tag 502 may trigger the backscattered modulated information signal 508 from the RFID tag 502. The RFID tag 502 may absorb or reflect signals from the RFID reader 504 based on the information to be communicated between the RFID tag 502 and the RFID reader 504. The RFID tag 502 may include a decreased number of active RF components (e.g., no active RF component) in some examples. By increasing a coverage area of the energy transfer signal 506, the RFID reader 504 and the RFID tag 502 may communicate at longer physical distances.

Wireless communication techniques associated with enhanced Mobile Broadband (eMBB), ultra-reliable and low latency communications (URLLC), machine-type communication (MTC), etc., may be supported for passive IoT devices. Passive IoT devices are another example of an energy receiving device. In examples, the RFID reader 504 may correspond to a base station BS 180 or an entity at a base station, and the RFID tag 502 may correspond to a UE 104 or be in communication with the UE. However, some wireless communication techniques may not support certain types of widespread RFID technology, such as passive IoT devices used for asset management, logistics, warehousing, and manufacturing, etc. Among other examples, passive IoT devices may include timing devices such as clocks, video devices, household tools, construction tools, lighting systems, etc.

Coverage enhancements for wireless energy transfer may be used to incorporate passive IoT devices into wireless networks. Using a cellular infrastructure, a base station/network entity may operate as the RFID reader 504 that transmits the energy transfer signal 506 to the RFID tag 502 for communicating with the passive IoT devices via RFID technology. The base station/network entity may provide energy to the passive IoT devices via the energy transfer signal 506 and may be configured to read/write information stored at the passive IoT devices. Information-bearing signals may be reflected from the passive IoT devices to the base station/network entity, which may read the reflected signal. For instance, the base station/network entity may decode information included in the information-bearing signals (e.g., backscattered modulated information signal 508) received from the passive IoT devices (e.g., RFID tag 502).

Figure 6:
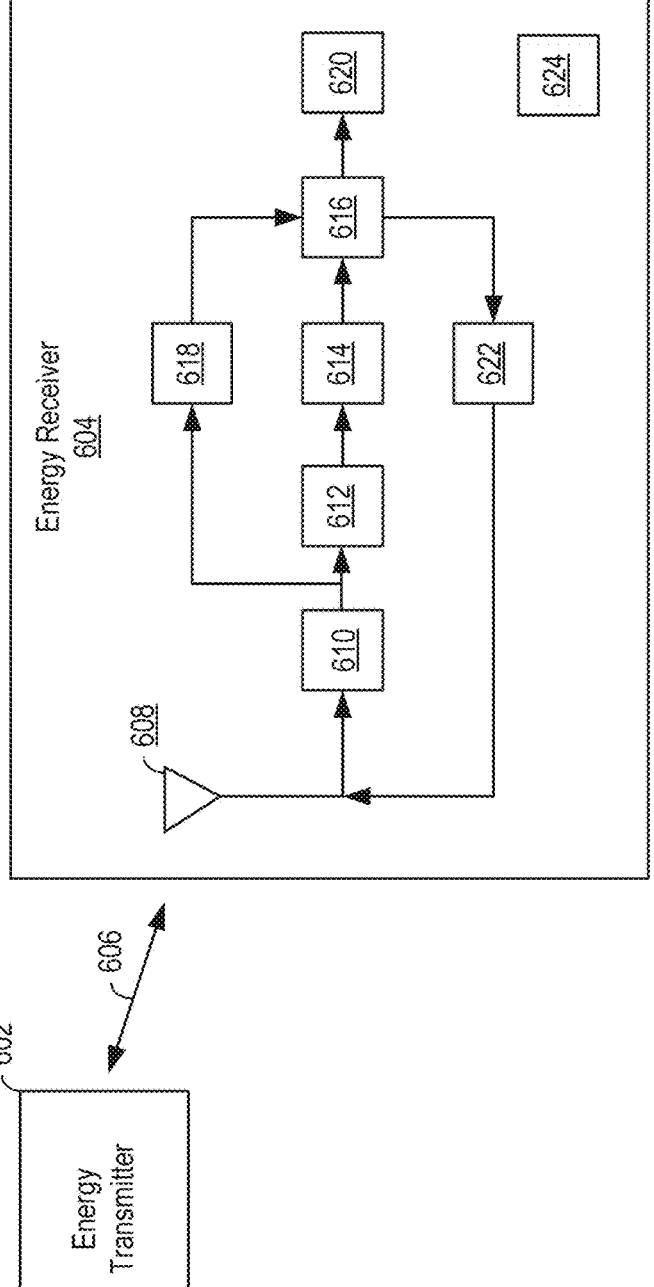
FIG. 6 illustrates s a diagram of a power harvesting circuit, in accordance with various aspects of the present disclosure.

FIG. 6 depicts an example of a wireless communications system 600 that supports techniques for communicating power transfer channel measurement information for energy transfer operations in accordance with one or more aspects of the present disclosure. The wireless communications system 600 may implement or be implemented by aspects of the wireless communications network 100 described with reference to FIG. 1. For example, the wireless communications system 600 may include an energy transmitter 602 and an energy receiver 604, which may be examples of the corresponding UE 104 and BS 102 devices described with reference to FIG. 1. In some examples, the energy transmitter 602 may be an example of the RFID reader 504 described in FIG. 5 and the energy receiver 604 may be an example of the RFID tag 502 described in FIG. 5.

The wireless communications system 600 may support communications between the energy transmitter 602 and the energy receiver 604. For example, the energy transmitter 602 may communicate signals with the energy receiver 604 over a communication link 606, which may be an example of a communication link 120 described with reference to FIG. 1.

The wireless communications system 600 may support the communication of power transfer channel measurement information between the energy transmitter 602 and the energy receiver 604. In certain aspects, the energy transmitter 602 may communicate an information-bearing signal indicating power transfer information to the energy receiver 604.

The energy receiver 604 may include various components configured to operate during an energy transfer procedure for RF power harvesting and to support the communication of signaling with the energy transmitter 602. For example, the energy receiver 604 may include an antenna 608 that supports the reception of signals transmitted by the energy transmitter 602 and the transmission of signals to the energy transmitter 602. The energy receiver 604 may also include an impedance matcher 610 (e.g., coupled with the antenna 608). The impedance matcher 610 may be a fixed or adjustable component that may set an impedance of a line from the antenna 608. The impedance matcher 610 may be tuned to an impedance of the antenna 608 so that an input to a power harvester 612 may be based on an increased power from the impedance matcher 610. Absorption or reflection of signals received at the antenna 608 may be based on an impedance of the impedance matcher 610.

The energy receiver 604 may include the power harvester 612 that is operable to harvest energy from energy signals received from the energy transmitter 602. For example, energy signals received from the energy transmitter 602 may be routed to the power harvester 612, which may harvest energy from the energy signals to power one or more components of the energy receiver 604. The power harvester 612 can exhibit a non-linear behavior corresponding to a diode's activation threshold, where the output of the power harvester 612 is affected by the diode's characteristic voltage requirement. For example, the power harvester 612 may incorporate a diode that requires a certain minimum voltage or power input, sourced from the antenna 608 and impedance matcher 610, to become operational. The minimum voltage or power needed to activate the diode in the power harvester 612 may exceed the power level of a received signal. For example, the input power to the power harvester 612 may be larger than −20 dBm, although −10 dBm may be a minimum power to activate the diode/power harvester 612 in some aspects. The power harvester 612 may exhibit higher efficiency in converting energy transfer signal into power at lower frequencies, based on the capacitance and/or resistance characteristics of its diode. In contrast to energy transfer signals, bits of an information signal may be decoded at power inputs as low as −100 dBm to −80 dBm.

In some examples, the energy receiver 604 may include a regulator 614 that is operable to regulate the energy harvested by the power harvester 612. For example, the regulator 614 may regulate the energy to a voltage or a current that is compatible with the one or more components powered by the energy. That is, the regulator 614 may regulate the non-linearity of the power harvester 612 prior to providing the output of the power harvester 612 to a controller 616.

The energy receiver 604 may include a demodulator 618 that is operable to demodulate signals received from the energy transmitter 602 and send the demodulated signals to the controller 616 included in the energy receiver 604. In some examples, the controller 616 may be an example of a microcontroller. The controller 616 may process the demodulated signals and perform one or more operations based on the information included in the demodulated signals. For example, the controller 616 may operate a sensor/actuator 620 included in (e.g., or coupled with, connected to) the energy receiver 604 in accordance with the information. For instance, the controller 616 may activate the sensor/actuator 620, deactivate the sensor/actuator 620, read a measurement taken by the sensor/actuator 620, or a combination thereof, among other operations that the controller 616 may perform.

In some examples, the controller 616 may send signaling to a modulator 622 that is to be transmitted to the energy transmitter 602. The modulator 622 may modulate the signaling in accordance with a modulation and coding scheme (MCS) and send the modulated signaling to the antenna 608 for transmission. For example, the modulator 622 may modulate an energy signal based on determined power transfer channel measurement information and send the modulate energy signal to the antenna 608 for transmission to the energy transmitter 602. Additionally, the modulator 622 may modulate identification information associated with the energy receiver 604, data, information associated with operation of the energy receiver 604, or information associated with the sensor/actuator 620, among other types of signaling that may be modulated by the modulator 622 and transmitted to the energy transmitter 602.

The wireless communications system 600 may support various types of energy receivers 604. For example, a first type of energy receiver 604 may correspond to an energy receiver 604 that excludes or is unconnected from a power source, such as a battery 624 (although other types of power sources are possible). Here, the components of the energy receiver 604 may be powered by the energy harvested from energy signals received at the energy receiver 604. A second type of energy receiver 604 may correspond to an energy receiver 604 that includes or is connected to a power source, such as the battery 624. Here, the components of the energy receiver 604 may be powered by the energy harvested from energy signals, the battery 624, or a combination thereof. In some examples, the power harvested from the energy signals may be used to charge the battery 624, which may increase a battery life of the battery 624 and reduce a frequency at which the battery 624 is replaced, among other benefits.

In some examples, a configuration of an information-bearing signal, such as a power transfer channel measurement information signal (e.g., backscatter modulated information signal 508 of FIG. 5), that is supported by the energy receiver 604 may be based on a type of the energy receiver 604. For example, an energy receiver 604 of the first type may support indicating the power transfer channel measurement information by reflecting a signal or modulating and reflecting an energy signal; however, transmitting a feedback message that includes the power transfer channel measurement information may be unsupported by an energy receiver 604 of the first type. An energy receiver 604 of the second type may support indicating the power transfer channel measurement information by reflecting the signal, modulation and reflecting an energy signal, or transmitting a feedback message that includes the power transfer channel measurement information. In certain aspects, the power transfer channel measurement information may be transmitted at a frequency based on information received from the energy transmitter 602.

For example, the energy transmitter 602 can transmit an SSB such that the energy receiver 604 can receive the SSB and locate beam sweep information. The SSB may include the timing information and a number of beams in the current beam sweep such that the energy receiver 604 can perform a power transfer channel measurement operation for each beam in the beam sweep. That is, the energy receiver 604 can measure an amount of power received over the beam sweep and respond to the energy transmitter 602 accordingly. In certain aspects, the sensor/actuator 620 performs a measurement operation to determine an amount of received power for one or more beams in the beam sweep. In certain aspects, the energy receiver 604 can respond to a beam in the beam sweep if the measured amount of received power is greater than another amount, such as a threshold amount. In some aspects, threshold information, such as one or more threshold amounts, may be included in the SSB.

In certain aspects the energy receiver 604 can signal to the energy transmitter 602 a best beam using backscattering, uplink communication, or an uplink signal in accordance with a random access channel (RACH) process. In accordance with examples of the present disclosure, the energy receiver 604 can utilize a frequency shift for backscattering based on a best beam, or a beam associated with a greatest measured amount of received power. In some aspects, frequency shift information (e.g., a frequency shift amount) can be included or otherwise indicated in the SSB. In some examples, the frequency shift amount may be preconfigured, hard coded, or otherwise previously set to a frequency shift amount.

Figure 7:
FIG. 7 illustrates a diagram indicating received power based on a separation distance, in accordance with various aspects of the present disclosure.

FIG. 7 illustrates diagrams 700-750 indicative of a received power based on a separation distance. For instance, the diagram 700 illustrates a received power of a radio frequency integrated circuit (RFIC) indicated via $P_r$(dBm) based on a separation distance r measured in meters (m) of associated devices, where $P_r$ refers to the transmitter power measured in decibels relative to one milliwatt. Energy receivers may be supported at short ranges (e.g., 1-10 m for passive IoT devices) based on RF link budgets.

The diagram 700 is indicative of a link budget analysis that illustrates whether an RFIC threshold input power is satisfied for an energy receiver, such as an RFID tag. As the separation distance between RFID devices increases, a corresponding RFIC received power may decrease. Separation distances illustrated in the link budget analysis of the diagram 700 range from 1-10 m, where the base station 702 may be providing an energy transfer signal to the RFID tag. The base station 702 may be the same as or otherwise correspond to the BS 180 and the energy receivers 704 and 706 may be the same as or otherwise correspond to the UE 104. A first aspect 710 of the link budget analysis may be indicative of a Friis link budget used to analyze and predict the performance between a wireless link between a transmitter and a receiver; the Friis link budget may be associated with a transmission equation that indicates the RF link budget of the RFID devices. A second aspect 712 of the link budget analysis may be indicative of the RFIC received power on a cardboard surface with a multipath channel. A third aspect 714 of the link budget analysis may be indicative of the RFIC received power on an aluminum surface with a multipath channel.

The separation distance for performing power transfer from an RFID reader to an RFID tag, may bottleneck energy transfer operations. The energy receiver 704 may have to receive a high input power (e.g., −13 dBm) for activation of the diode/RFID tag. A larger separation distance between the RFID reader and the RFID tab may cause a lower received power at the RFID tag. A low input power, such as −20 dBm or lower, may not provide a threshold cost and conversion efficiency between the RFID devices. For example, the cost and conversion efficiency may be less than 1 percent at input powers lower than −20 dBm. Reflections of the energy transfer signal in the multi-path channel may also cause a reduction/fading to the energy transfer signal that may decrease a range of the energy transfer signal.

A base station 702 may transmit both energy transfer signals and communication/information signals to receiving devices, such as energy receivers 704 and 706, at a predefined power level. Power harvesting procedures performed based on the energy transfer signal may be associated with a high input power (e.g., −20 dBm to −10 dBm) at the energy receivers 704 and 706. Communication signals associated with information transfer between the base station 702 and the energy receive 706 may be decoded at much lower input powers (e.g., −70 dBm to −100 dBm). Thus, a first coverage area 708A associated with the energy transfer signal may be smaller than a second coverage area 708B associated with communication/information signals transmitted to the energy receiver 706.

The second coverage area 708B for information decoding may range from hundreds of meters to kilometers based on a transmit power and a waveform of the information signal. However, due to the higher input power for energy transfer signals, the first coverage area 708A of the energy transfer signal may be less than 10 m. Thus, the energy receiver 704 may also be configured to transmit energy transfer signals to an apparatus or network entity, such as a passive RFID tag, to assist the base station 702 with energy transfer operations and increase the first coverage area 708A of the base station 702.

Figure 8:
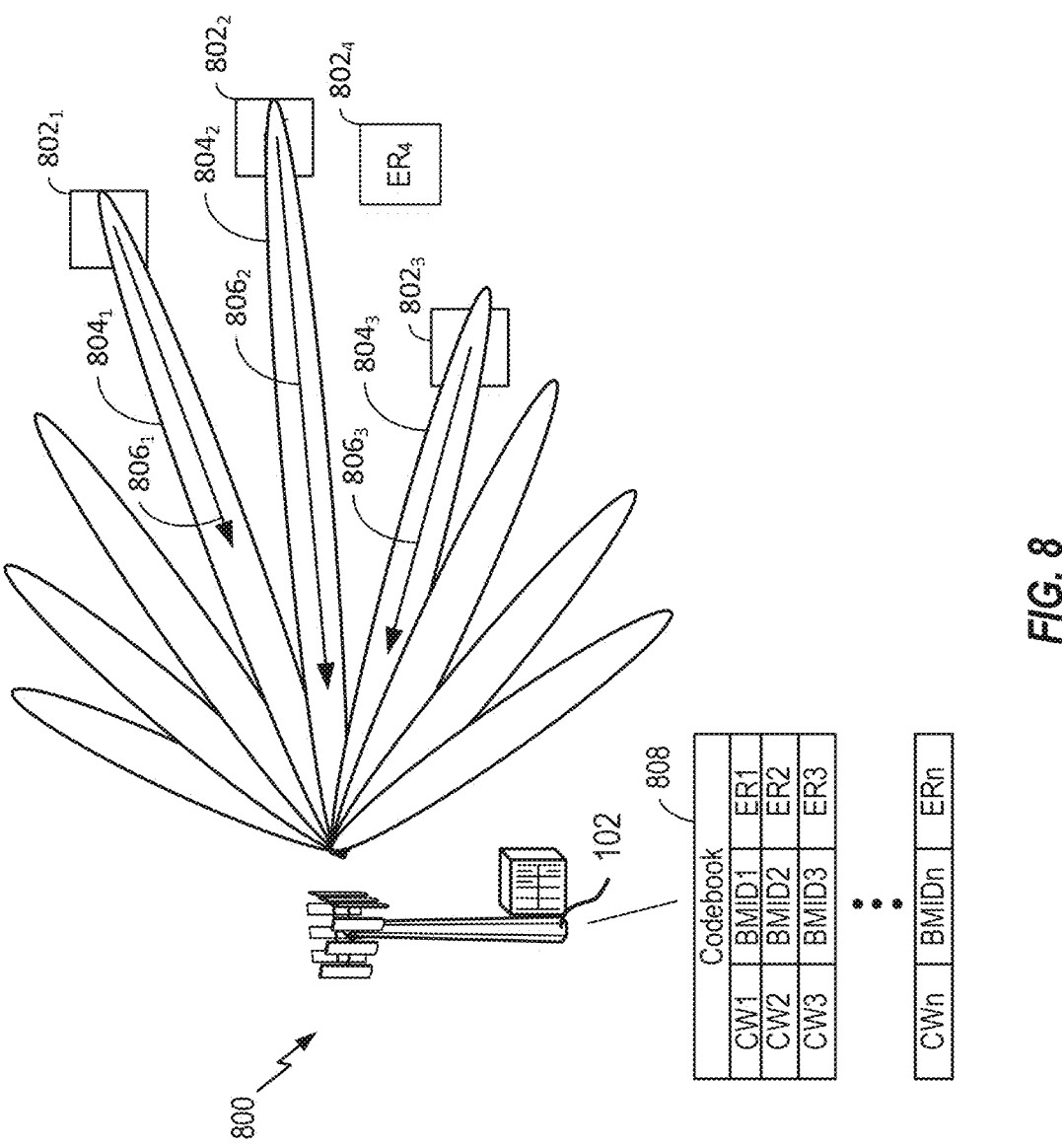
FIG. 8 illustrates a diagram directed to aspects of a wireless communications system and beam sweep patterns.

FIG. 8 depicts a wireless communications system 800 with a base station 102 transmitting multiple beams, including beams $804_1$-$804_3$, as part of a beam sweep pattern to cover multiple energy receivers $802_1$-$802_3$. Each of the energy receivers $802_1$-$802_3$ may represent a UE 104 as described in FIG. 1. Each of the energy receivers $802_1$-$802_3$ may respond to the beam it receives by backscattering a signal. In certain aspects, a frequency with which the energy receiver uses to respond to the beam may be shifted according to a power measurement performed on the received beam.

In some examples, the base station 102 includes a beam codebook 808 that defines the set of beams used for the directional beam sweep and ongoing energy transfer operations. For example, the beam codebook 808 may include a codeword (e.g., CW1) specific to beam $804_1$ that is directed in the direction (e.g., ER1) of energy receiver $802_1$. Beam $804_1$ could be formed by the base station 102 setting phases and amplitudes of signals sent to each antenna element in order to create a combined beam pattern directed towards the energy receiver $802_1$. The beam codebook 808 may include a beam identifier (e.g., BMID1) that is associated with the codeword (e.g., CW1). As another example, the beam codebook 808 could include a codeword (e.g., CW2) specific to beam $804_2$. Beam $804_2$ could be formed by a different set of phases and amplitudes for each antenna element, tailored to direct energy of the beam towards energy receiver $802_2$ (e.g., ER2). The beam codebook 808 may include a beam identifier (e.g., BMID2) that is associated with the codeword (e.g., CW2). Similarly, the beam codebook 808 could include a codeword specific to beam $804_3$. Beam $804_3$ could be formed by a different set of phases and amplitudes for each antenna element, tailored to direct energy of the beam towards energy receiver $802_3$ (e.g., ER3). The beam codebook 808 may include a beam identifier (e.g., BMID3) that is associated with the codeword (e.g., CW3). The multiple beams created by the base station 102 allow it to efficiently direct energy and communicate with energy receivers located in different physical directions from the base station 102. By intelligently selecting beam directions, the base station 102 can cover the areas where energy receivers are known to be located.

The beam codebook 808 represents the set of beam patterns and directions that the base station 102 can utilize for beam sweeping and radio coverage. The beam codebook 808 allows the base station 102 to efficiently select desired beam shapes and directions rather than having to calculate the antenna settings from scratch each time. The beam directions in the beam codebook may be chosen to cover expected areas where energy receivers are located or may be updated dynamically based on detected backscatter signals. Initially, the beam codebook 808 does not have a beam specifically covering the location of the energy receiver 802₄. This could occur if the energy receiver is new to the system or has moved, such that the existing beam codebook 808 does not have a beam pointing in the direction to reach that tag. As depicted in FIG. 8, the beam codebook 808 does not have a beam specifically covering the location of energy receiver 802₄.

During a beam sweep operation, beams of different directions are transmitted at one or more points in time. In certain aspects, the energy receivers are configured to respond to the base station's beam sweep by backscattering a signal with encoded information. Backscatter modulation allows the energy receivers to reflect and modify the incoming signals from the base station in order to transmit data. This provides a low power method for the energy receivers to communicate with the base station 102.

For example, when beam 804₁ reaches the energy receiver 802₁, the energy receiver 802₁ absorbs some of the RF energy and uses it to power its internal circuitry. The energy receiver 802₁ is also configured to backscatter a response signal which allows the base station 102 to detect the energy receiver's presence in that beam direction. In some examples, the energy receiver 802₁ backscatters a response 8061 with a frequency shift, where the frequency shift may be an offset from a frequency associated with the beam 804₁. The frequency shift allows the energy receiver 802₁ to inform the base station 102 as to an amount of energy received by the energy receiver 802₁.

Similarly, when beam 804₂ reaches the energy receiver 802₂, the energy receiver 802₂ absorbs some of the RF energy and uses it to power its internal circuitry. The energy receiver 802₂ is also configured to backscatter a response signal which allows the base station 102 to detect the energy receiver's presence in that beam direction. In some examples, the energy receiver 802₂ backscatters a response 806₂ with an applied frequency shift, allowing the energy receiver 802₂ to inform the base station 102 as to an amount of energy received by the energy receiver 802₁. In another example, when beam 804₃ reaches the energy receiver 802₃, the energy receiver 802₃ absorbs some of the RF energy and uses it to power its internal circuitry. The energy receiver 802₃ is also configured to backscatter a response signal which allows the base station 102 to detect the energy receiver's presence in that beam direction. In some examples, the energy receiver 802₃ backscatters a response 806₃ with an applied frequency shift, allowing the energy receiver 802₃ to inform the base station 102 as to an amount of energy received by the energy receiver 802₃.

The frequency shifts can be predetermined and known by the base station 102. By tuning its receiver to the different frequency offsets, the base station can isolate the backscattered signals from each energy receiver and/or each beam. The frequency shifts may correspond to binary data being transmitted from the energy receiver, such as an energy receiver ID number or sensor data. Or the frequency shifts may indicate the presence of an energy receiver without including identifying information In certain aspects, the frequency shifts can be dependent upon a power measurement, performed by the energy receiver, for a specific beam. In some examples, an energy receiver may respond to one or more beams during a beam sweep operation. In certain aspects, an energy receiver may respond to the beam associated with a greatest amount of measured power. In certain aspects, the energy receiver may respond to a subset of the beams of the beam sweep, where the subset may be determined based on whether a measured power amount associated with each beam meets or exceed a power amount, such as a power threshold.

For example, during a beam sweep operation, the energy receiver 802₄ can perform a power measurement for each of the received beams during a beam sweep operation. In certain aspects, the power measurement of a received beam may be below a threshold. In such instances, the energy receiver 802₄ can respond to the base station 102 via PRACH, an uplink signal, or backscattering one or more of the received beams. In certain aspects, the energy receiver 802₄ may respond to the received beam of the beam sweep having the highest power measurement.

FIG. 9 depicts additional details associated with providing a beam in the direction of an energy receiver, where the energy receiver is new to the communication system or has moved within the communication system. As depicted in FIG. 9, the base station 102 may periodically transmit an SSB 902 allowing for energy receiving devices, such as UEs, to identify and connect to a communications network and/or to perform a power transfer operation. The SSB 902 can be broadcast in certain fixed time-frequency resources so that devices can find the signal without needing to decode the entire bandwidth or continuously scan for a signal. Stated another way, the SSB 902 may be transmitted by the base station 102 and allow energy receivers to synchronize and obtain information about a beam sweep procedure performed by the base station 102. In certain aspects, the SSB includes, but is not limited to, timing information, beam sweep pattern information, power threshold information, and frequency shift information.

Timing information allows energy receivers to determine when a beam sweep will occur. For example, the timing information included in the SSB can indicate time slots and periodicity of beam sweep operations performed by the base station. Accordingly, the energy receivers can dedicate one or more resources to acquire, identify, and/or process a detected or received beam. Beam sweep pattern information can include details about how many beams will be transmitted and in what sequence; accordingly, an energy receiver can anticipate or otherwise be ready for one or more beams in the sweep.

Power threshold information may refer to one or more threshold power levels that the energy receivers can use to determine if a beam is strong enough to backscatter a response. For example, threshold information can be used to determine a frequency shift to apply and/or provide beam strength information back to the base station 102. In some examples, the threshold information may include a plurality of threshold levels indicating different power levels such that a frequency shift can be determined based on one or more of the plurality of threshold levels.

For example, threshold information may include power threshold levels 904₁, 904₂ and 904₃. In some examples, the energy receiver measures a power level associated with a beam and compares the power level to the threshold power levels received via the SSB. In examples, a measured amount of power corresponding to $906_1$ may exceed power threshold level $904_1$, while a measured amount of power corresponding to $906_2$ would exceed power threshold level $904_3$ but would not exceed power threshold levels $904_2$ and $904_1$.

The frequency shift information can refer to one or more frequency shifts or codes the energy receivers should use in a backscatter response for each beam. The frequency shift information may correspond to a power level threshold and/or may be beam specific. Accordingly, energy receiver response can be coordinated during a beam sweep process. In certain aspects, the energy receiver can use physical properties or external stimuli to alter the frequency of an RF signal of the received beam based on the frequency shift information and/or the power level thresholds. For example, the energy receiver can have a have a physical structure that resonates at a specific frequency. This structure can be mechanically or thermally altered to change its resonant frequency, which in turn modifies the frequency of the RF signal it reflects or re-radiates. Alternatively, or in addition, the energy receiver can modulate the incident RF signal and reflects it back with a frequency shift. This modulation can be done by changing the impedance of the antenna. For example, in RFID technology, the energy receiver modulates the reflected signal by switching the impedance of its antenna between two states, effectively shifting the frequency of the reflected signal.

Figure 10:
FIG. 10 illustrates a diagram with additional details directed to a beam sweep process implemented by a base station.

FIG. 10 depicts additional details directed to a beam sweep process implemented by the base station 102. While other energy receivers may be present, FIG. 10 depicts details specific to the energy receiver $802_4$. In examples, the base station 102 transmits a SSB 902 (FIG. 9) which is received by the energy receiver $802_4$. The SSB 902 (FIG. 9) may convey timing information, beam sweep pattern information, power threshold information, and frequency shift information, where the power threshold information and the frequency shift information indicates that two frequency shifts, $\Delta f1$ and $\Delta f2$, corresponding to two threshold power levels may be used for backscattering.

The base station 102 may initiate a beam sweep process whereby beams may be guided in specific directions and may have specific shapes. For example, the base station 102 may cause beams to sweep across areas as depicted in FIG. 10. In some examples, the beam sweep process may be initiated at any location from the base station 102 and/or at any direction from the base station 102 and proceed in any direction around the base station 102.

In certain aspects, the energy receiver $802_4$ may detect and/or receive one or more beams, such as beam $1004_2$ and $1004_1$. In certain aspects, the energy receiver $802_4$ may backscatter the incoming signal based on the measured amount of power of the beam and/or whether the measured amount of power of the beam exceeds a power level threshold. In certain aspects, backscattering can be performed for each beam detected by the energy receiver $802_4$. In certain aspects, backscattering can be performed for a beam in the beam sweep determined to have a greatest amount of power as detected and measured by the energy receiver $802_4$.

For example, the energy receiver may measure an amount of power using sensor/actuator 620 (FIG. 6) for each respective beam and compare the measured amount of power to the power threshold information indicated by the SSB. In examples, the power level measured for beam $1004_1$ may exceed that of beam $1004_2$. In examples, the power level measured for beam $1004_1$ may exceed that of each of other beams in the beam sweep. In examples, the power level measured for beam $1004_1$ may exceed one or more power level thresholds indicated by the power threshold information.

In certain aspects, the energy receiver $802_4$ may backscatter the incoming signal based on the measured power level of beam $1004_1$ and/or predefined power level thresholds. In certain cases, this backscattering can take place on the frequency (e.g., 1010) originally received for beam $1004_1$. In other cases, the backscattering may occur on a frequency (e.g., $1012_1/1012_2$) that is different from the frequency originally received for beam $1004_1$. For example, backscattering can take place in accordance with a frequency shift amount $\Delta f_1$ and/or $\Delta f_2$, where $\Delta f_1$ and $\Delta f_2$ indicate a frequency offset from the frequency (e.g., 1010) originally received for the beam. In certain aspects, $f_1$ and $f_2$ indicate the backscattering frequency.

In accordance with examples of the present disclosure, the energy receiver $802_4$ can perform backscattering with signals $1006_1$ and/or $1006_2$, which are detected by the base station 102. Based on the received backscattering signals $1006_1$ and $1006_2$, the base station 102 can add one or more of the beams to the beam codebook (e.g., modified beam codebook 1008). In some examples, the beam may be associated with the energy receiver within the beam codebook. In some examples, the modified beam codebook 1008 may include code words for one or more beams that are transmitted in a direction of the energy receiver. In some examples, the beam codebook 1008 may include a codeword for a beam that is transmitted in the direction of two or more energy receivers.

Figure 11:
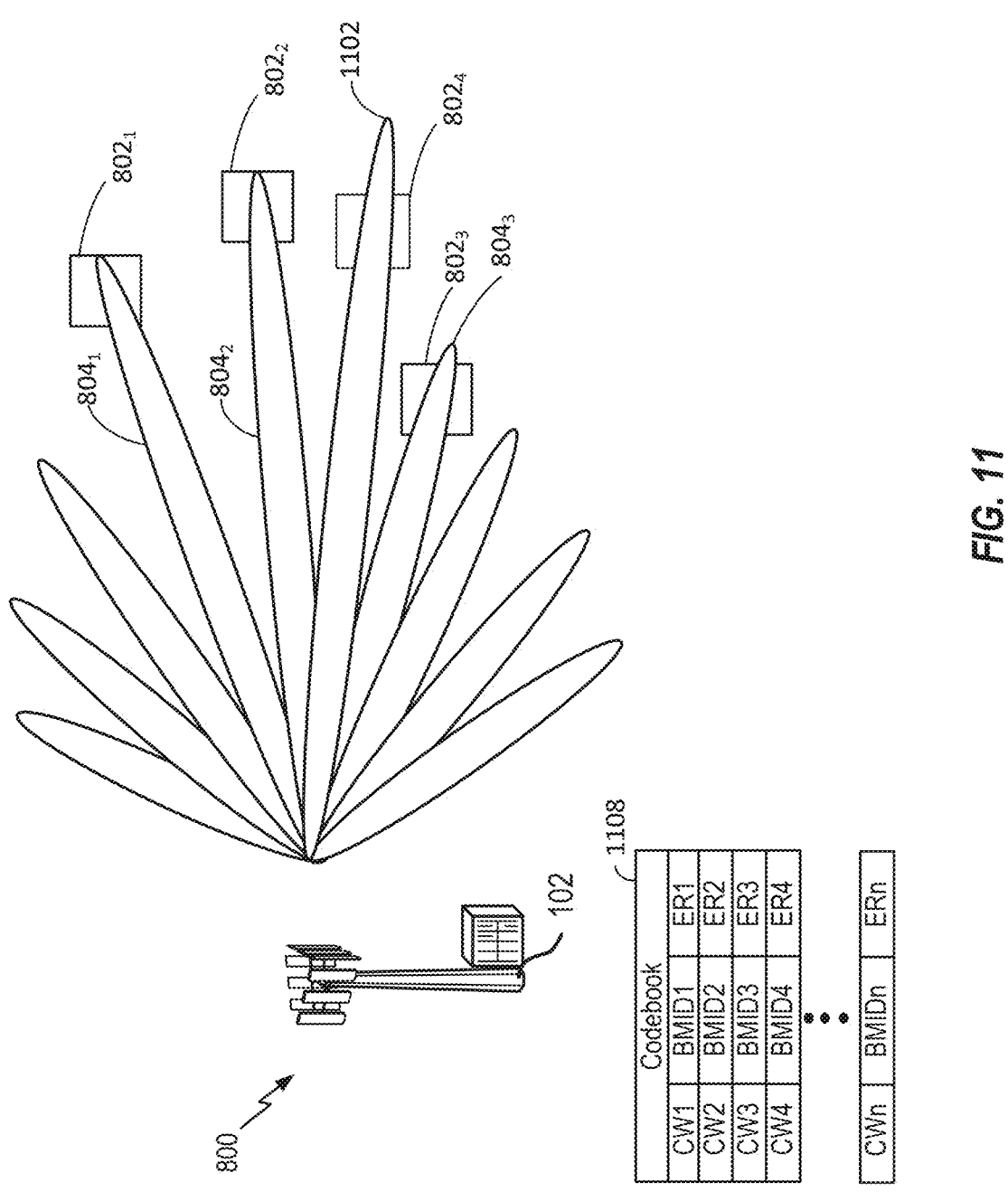
FIG. 11 illustrates a diagram directed to transmitting one or more beams.

As a result of the beam sweep process, the base station 102 may transmit one or more beams (e.g., beam 1102) in the direction of the energy receiver $802_4$, as depicted in FIG. 11. In certain aspects, the beam 1102 may be the same as, similar to, or different from the beam $1004_1$ and/or $1004_2$ detected during the beam sweep process. For example, beam 1102 could represent a relatively wider beam that covers a general area where energy receiver $802_4$ was detected. Alternatively, beam 1102 could represent a relatively narrower, more focused beam directed precisely at the energy receiver's $802_4$ detected location. In certain aspects, the focused beam directed to the energy receiver's $802_4$ direction provides the strongest and/or most efficient power delivery to the energy receiver $802_4$. Codebook 1108 reflects the added beam ER4 associated with the beam 1102.

This adaptive process of detecting new energy receivers and updating the beam codebook 1108 allows the base station 102 to provide robust wireless power coverage even as energy receivers move or new energy receivers appear. The combination of performing a beam sweep operation and receiving a signal indicative of an amount of power received by an energy receiver provides efficient discovery and power delivery. By adapting the beam codebook 1108 to incorporate new beam directions, the base station 102 can provide wireless energy transfer coverage that reaches all energy receivers, even as they move or as new energy receivers appear, thus providing a technical solution to the aforementioned technical problems with existing systems.

Example Operations of Entities in a Communications Network

Figure 12:
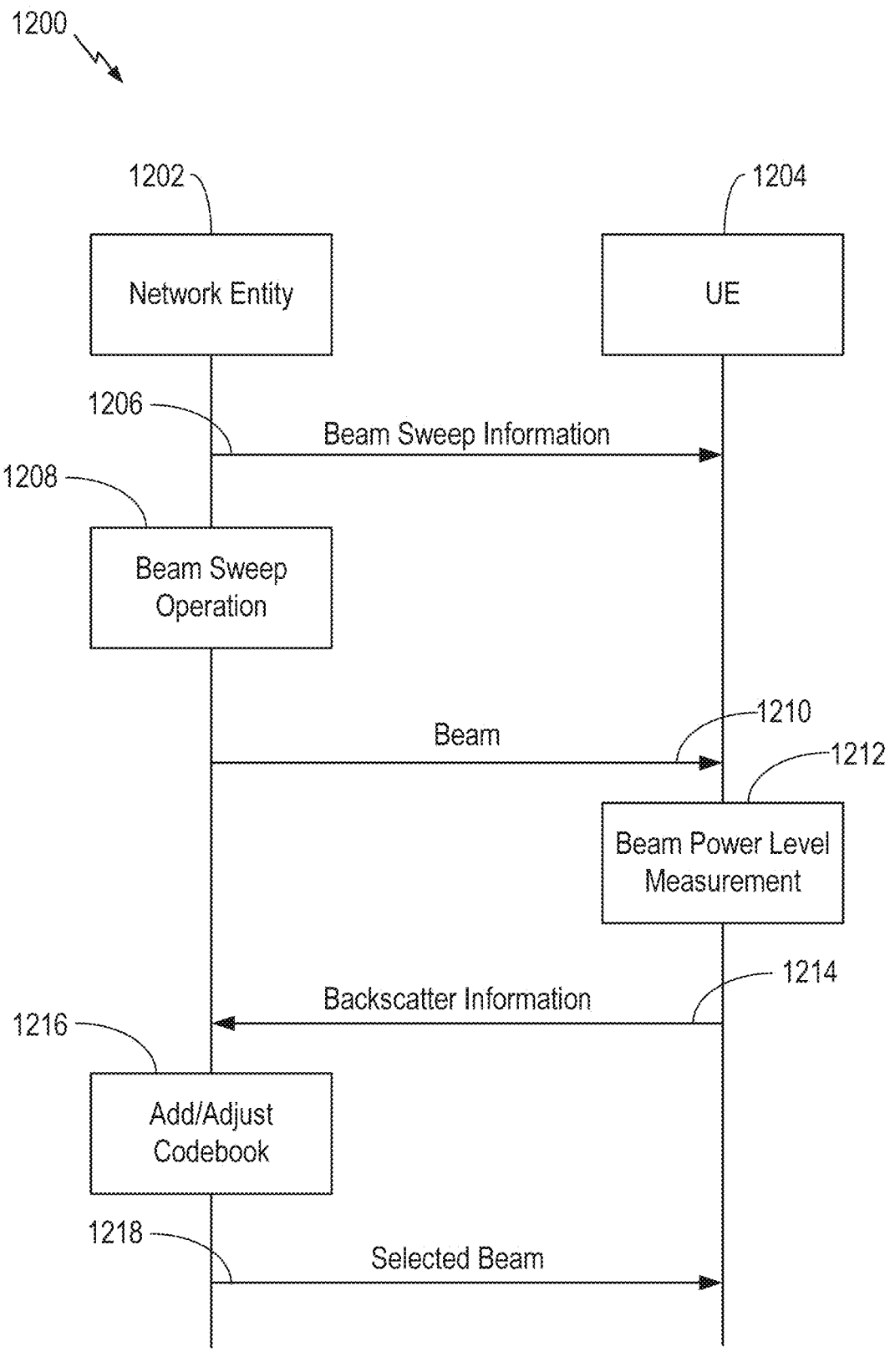
FIG. 12 depicts a process flow for communications in a network between a base station and a UE.

FIG. 12 depicts a process flow 1200 for communications in a network between a network entity 1202 and a user equipment (UE) 1204. In some aspects, the network entity 1202 may be an example of the BS 102 depicted and described with respect to FIGS. 1 and 3 or a disaggregated base station depicted and described with respect to FIG. 2. Similarly, the UE 1204 may be an example of UE 104 depicted and described with respect to FIGS. 1 and 3. However, in other aspects, UE 104 may be another type of wireless communications device and BS 102 may be another type of network entity or network node, such as those described herein.

In accordance with examples of the present disclosure, the network entity 1202 may transmit an SSB including beam sweep information 1206. The beam sweep information 1206 can include timing information, beam sweep pattern information, power threshold information, and/or frequency shift information. The network entity 1202 can initiate a beam sweep operation 1208 and provide one or more beams 1210 for reception by the UE 1204. In certain aspects, the beam sweep operation 1208 is conducted in accordance with a beam codebook. For example, the beam codebook may include codewords corresponding to one or more beam directions as previously described with respect to FIGS. 8-11. In examples, the UE 1204 may receive one or more beams of the beam sweep process. In certain aspects, the UE 1204 performs a beam power measurement 1212 for each of the received beams. In certain aspects, the UE 1204 can utilize a received signal strength indicator (RSSI) or a reference signal received power (RSRP) as an indication of the beam power measurement.

In certain aspects, the UE 1204 may perform a backscatter operation to backscatter information 1214 based on one or more of the received beams. For example, the UE 1204 may perform a backscatter operation for a single beam that has a greatest beam power measurement. As another example, UE 1204 may perform a backscatter operation to backscatter information 1214 for all received beams or for a subset of the received beams. As described in FIG. 10, the backscatter information may be transmitted in accordance with a frequency shift amount.

The network entity 1202 can add or adjust the beam codebook 1216 based on the backscatter information 1214 received from the UE 1204. In examples, the network entity 1202 can adjust a beam width based on the backscatter information 1214. Accordingly, the network entity 1202 can provide a selected beam 1218 to the UE 1204 based on the beam, or codeword, added to the beam codebook of the network entity 1202.

Example Operations of a User Equipment

FIG. 13 shows a method 1300 for wireless communications by an UE (e.g., apparatus), such as UE 104 of FIGS. 1 and 3.

Method 1300 begins at 1302 with receiving a synchronization signal, the synchronization signal including timing information associated with a directional beam sweep procedure, and power threshold information indicating beam power criteria evaluated during the directional beam sweep procedure.

Method 1300 then proceeds to step 1304 with receiving, from the directional beam sweep, a first directional beam in accordance with the timing information, the first directional beam providing radio frequency energy for energy harvesting by the apparatus.

Method 1300 then proceeds to step 1306 with measuring an amount of power associated with the first directional beam. For example, if the synchronization signal provides a power threshold of −15 dBm, and the apparatus measures a beam power of −10 dBm, the threshold is exceeded. In response, the apparatus may provide feedback using backscatter modulation with a particular frequency shift indicating the threshold was exceeded by 5 dB. Alternatively, if the apparatus measures a beam power of −18 dBm, the −15 dBm threshold is not exceeded. In this case, the apparatus may transmit a feedback signal to the base station using a RACH procedure rather than backscattering, to indicate an insufficient beam power case.

Method 1300 then proceed to step 1308 with comparing the measured amount of power to the power threshold information.

Method 1300 then proceeds to step 1310 with providing a feedback signal, wherein the contents of the feedback signal are based on the comparison with the power threshold information associated with the directional beam sweep. For example, if the measured power level exceeds the threshold received in the synchronization signal by 3 dBm, the apparatus may provide a feedback signal with a frequency shift of 150 kHz to indicate the amount the threshold was exceeded.

In one aspect, method 1300 further includes obtaining at least one power threshold level from the power threshold information included in the synchronization signal; and providing the feedback signal, wherein the feedback signal indicates whether the measured amount of power exceeds the power threshold information obtained from the synchronization signal.

In one aspect, method 1300 further includes obtaining at least one frequency offset from the synchronization signal; receiving the directional beam at an initial frequency; obtaining at least one frequency offset from the synchronization signal; and providing the feedback signal at a feedback frequency that is different from the initial frequency, wherein the feedback frequency is based on the at least one frequency offset obtained from the synchronization signal.

In one aspect, method 1300 further includes obtaining at least one power threshold level from the power threshold information included in the synchronization signal; comparing the measured amount of power to the at least one power threshold level; and obtaining the at least one frequency offset based on the measured amount of power exceeding the at least one power threshold level.

In one aspect, method 1300 further includes providing the feedback signal as a backscattered response based on the first directional beam.

In one aspect, method 1300 further includes receiving a second directional beam from the beam sweep in accordance with the timing information, the second directional beam providing radio frequency energy for energy harvesting by the apparatus; measuring an amount of power associated with the second directional beam; comparing the measured amount of power associated with the second directional beam to the power threshold information included in the synchronization signal; and providing a second feedback signal based on the comparison with the power threshold information associated with the directional beam sweep.

In one aspect, method 1300 further includes receiving a subsequent second directional beam from the beam sweep in accordance with the timing information, the second directional beam providing radio frequency energy for energy harvesting by the apparatus; measuring an amount of power associated with the second directional beam; comparing the measured amount of power associated with the second directional beam to the amount of power associated with a previously received directional beam that is different from the first directional beam; and providing the feedback signal for the directional beam having a greatest measured amount of power.

In one aspect, method 1300 further includes providing the feedback signal at a frequency shifted from the first directional beam based at least in part on frequency shift information, wherein the synchronization signal comprises frequency shift information.

In one aspect, method 1300 further includes transmitting the feedback signal to a network entity using a random access channel procedure.

In one aspect, method 1300 further includes receiving a request for identification information from a network entity following receipt of the feedback signal; and transmitting the identification information to the network entity in response to the request.

In one aspect, method 1300 further includes utilizing at least one of a received signal strength indicator or a reference signal received power.

In one aspect, method 1300 further includes receiving the synchronization signal in a first frequency band; and receiving the first directional beam in a second frequency band, the second frequency band being lower than the first frequency band.

In one aspect, method 1300 further includes harvesting energy from the first directional beam.

In one aspect, method 1300 further includes determining a beam index associated with the first directional beam; and including the beam index in the feedback signal provided to a network entity.

In one aspect, the directional beam sweep comprises a plurality of beam sweep operations over time, and the synchronization signal provides a periodicity of the plurality of beam sweep operations.

In one aspect, the method 1300 further includes receiving a second synchronization signal that indicates an updated number of beams associated with another directional beam sweep.

In one aspect, the method 1300 further includes measuring the amount of power associated with the first directional beam using a power harvester circuit of the apparatus.

Figure 15:
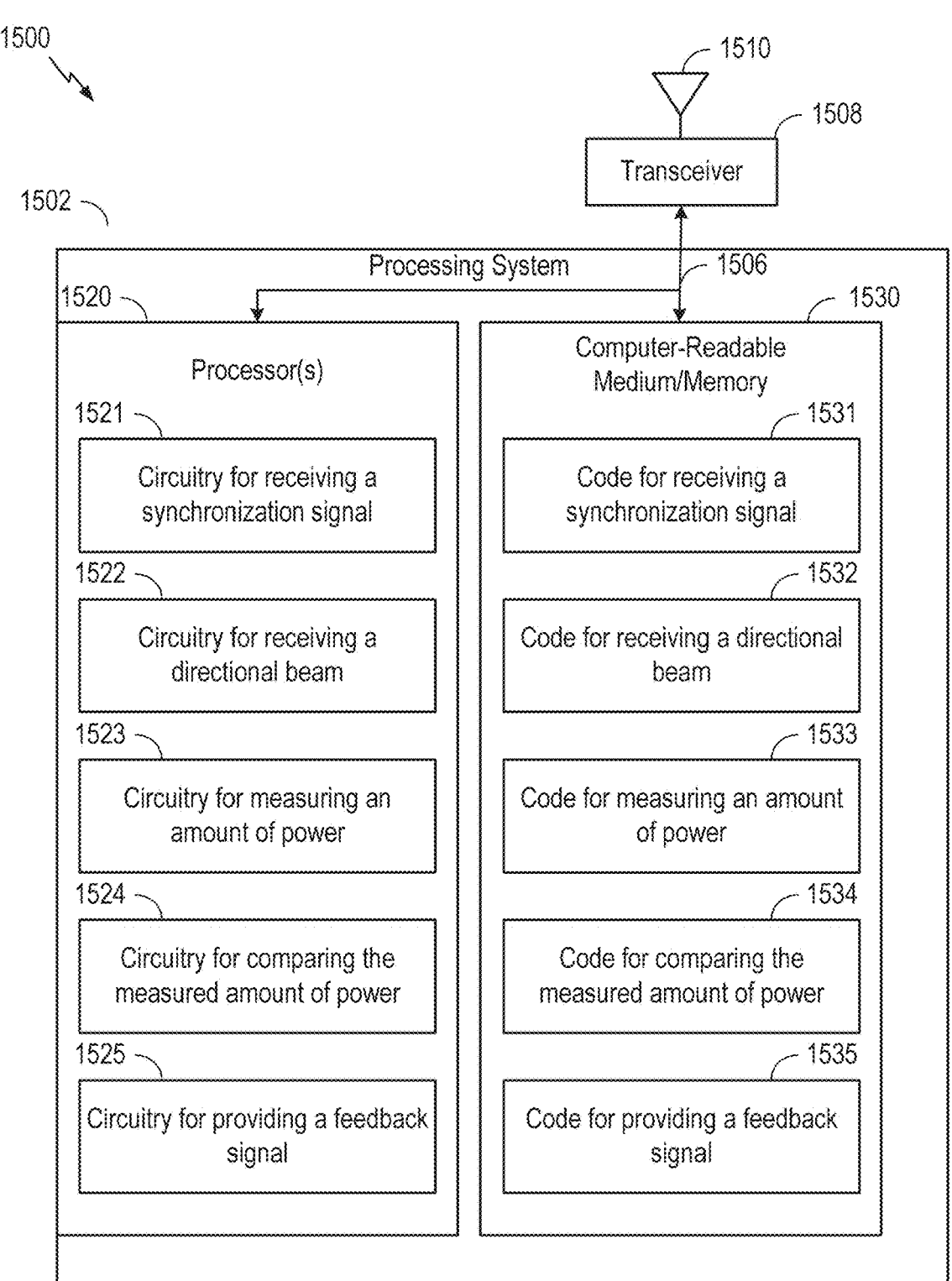
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Operations of a Network Entity

FIG. 14 shows a method 1400 for wireless communications by a network entity, such as BS 102 of FIGS. 1 and 3, or a disaggregated base station as discussed with respect to FIG. 2.

Method 1400 begins at 1402 with transmitting a synchronization signal, the synchronization signal including timing information associated with a directional beam sweep procedure, and power threshold information indicating beam power criteria evaluated during the directional beam sweep procedure.

Method 1400 then proceeds to step 1404 with transmitting a plurality of directional beams in accordance with the timing information, each directional beam of the plurality of directional beams associated with a beam index and configured to provide radio frequency energy for energy harvesting.

Method 1400 then proceeds to step 1406 with receiving a feedback signal from a user equipment in response to at least one of the plurality of directional beams.

Method 1400 then proceeds to step 1408 with updating a beam codebook based at least in part on the feedback signal received from the UE.

In one aspect, method 1400 further includes receiving the feedback signal at a frequency shifted from the at least one of the plurality of directional beams based at least in part on frequency shift information, wherein the synchronization signal comprises frequency shift information.

In one aspect, method 1400 further includes receiving the feedback signal via a random access channel procedure.

In one aspect, the feedback signal includes a beam index associated with the at least one of the plurality of directional beams.

In one aspect, method 1400 further includes transmitting the synchronization signal in a first frequency band and transmit the plurality of directional beams in a second frequency band.

In one aspect, method 1400 further includes adjusting a beam width associated with the at least one of the plurality of directional beams based at least in part on the feedback signal.

In one aspect, the feedback signal indicates an amount of power measured by the UE for the at least one of the plurality of directional beams.

In one aspect, method 1400 further includes updating the beam codebook based on comparing an amount of power measured for the at least one of the plurality of directional beams by the UE to the power threshold information.

In one aspect, method 1400 further includes transmitting wireless power to the UE via a directional beam in accordance with the updated beam codebook.

In one aspect, the power threshold information indicates one or more power thresholds for comparison with measured power by the UE.

In one aspect, the feedback signal comprises a backscattered modulation of the at least one of the plurality of directional beams.

Figure 16:
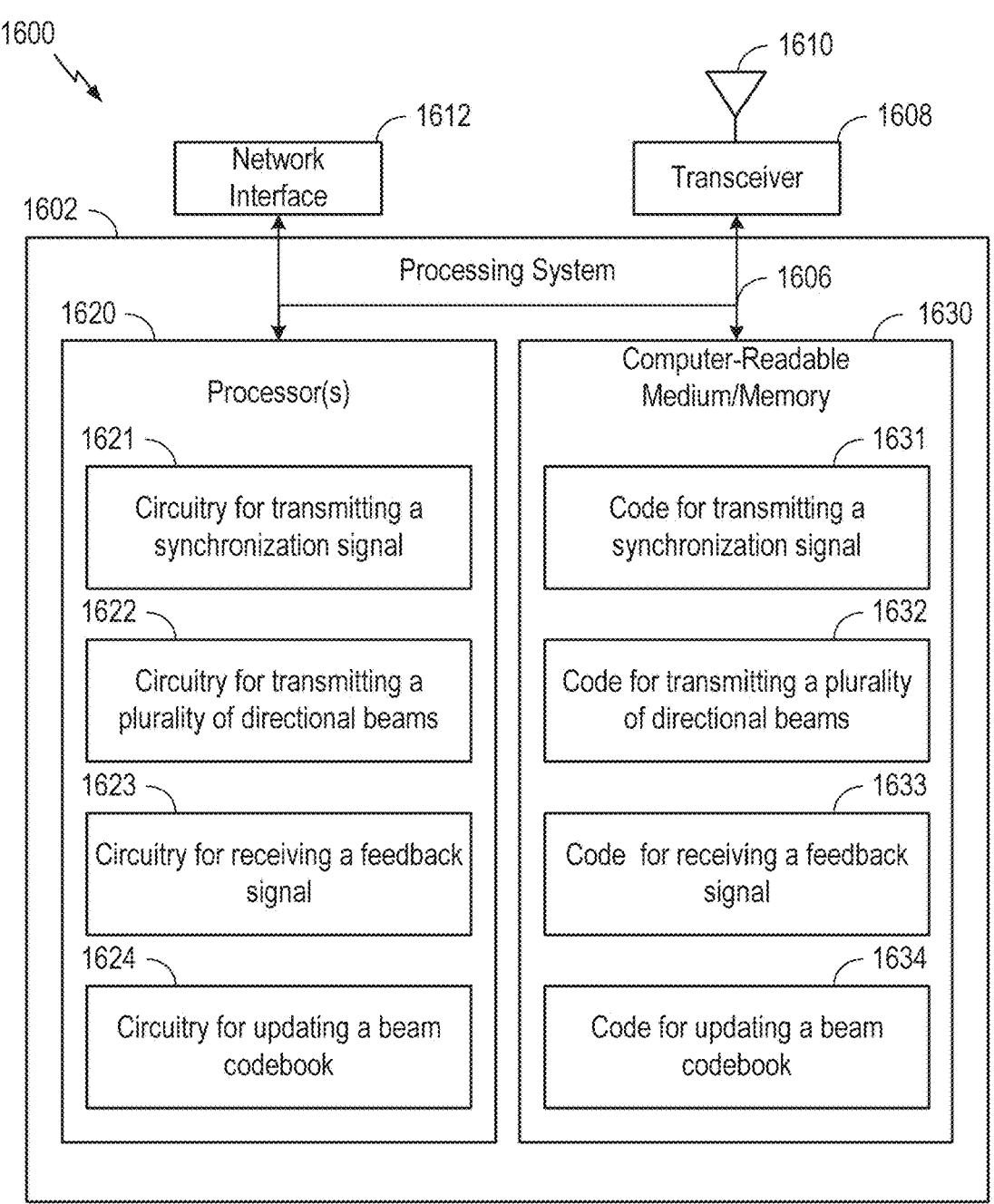
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400.

Communications device 1600 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment, such as UE 104 described above with respect to FIGS. 1 and 3.

The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500. In certain aspects, device 1500 may include the circuitry as described in FIGS. 5 and 6.

The processing system 1502 includes one or more processors 1520. In various aspects, the one or more processors 1520 may be representative of one or more of receive processor 358, transmit processor 364, TX MIMO processor 366, and/or controller/processor 380, as described with respect to FIG. 3. The one or more processors 1520 are coupled to a computer-readable medium/memory 1530 via a bus 1506. In certain aspects, the computer-readable medium/ memory 1530 is configured to store instructions (e.g., computer-executable code) that when executed by the one or more processors 1520, cause the one or more processors 1520 to perform the method 1300 described with respect to FIG. 13, or any aspect related to it, including any additional steps or sub-steps described in relation to FIG. 13. Note that reference to a processor performing a function of communications device 1500 may include one or more processors performing that function of communications device 1500, such as in a distributed fashion.

In the depicted example, computer-readable medium/ memory 1530 stores code (e.g., executable instructions) for receiving a synchronization signal 1531, code for receiving a directional beam 1532, code for measuring an amount of power 1533, code for comparing the measured amount of power 1534, and code for providing a feedback signal 1535. Processing of the code 1531-1535 may enable and cause the communications device 1500 to perform the method 1300 described with respect to FIG. 13, or any aspect related to it.

The one or more processors 1520 include circuitry configured to implement (e.g., execute) the code stored in the computer-readable medium/memory 1530, including circuitry for receiving a synchronization signal 1521, circuitry for receiving a directional beam 1522, circuitry for measuring an amount of power 1523, circuitry for comparing the measured amount of power 1524, and circuitry for provide a feedback signal 1525. Processing with circuitry 1521-1525 may enable and cause the communications device 1500 to perform the method 1300 described with respect to FIG. 13, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1508 and/or antenna 1510 of the communications device 1500 in FIG. 15, and/or one or more processors 1520 of the communications device 1500 in FIG. 15. Means for communicating, receiving or obtaining may include the transceivers 354, antenna(s) 352, receive processor 358, and/or controller/ processor 380 of the UE 104 illustrated in FIG. 3, transceiver 1508 and/or antenna 1510 of the communications device 1500 in FIG. 15, and/or one or more processors 1520 of the communications device 1500 in FIG. 15.

FIG. 16 depicts aspects of an example communications device. In some aspects, communications device 1600 is a network entity, such as BS 102 of FIGS. 1 and 3, or a disaggregated base station as discussed with respect to FIG. 2.

The communications device 1600 includes a processing system 1602 coupled to a transceiver 1608 (e.g., a transmitter and/or a receiver) and/or a network interface 1612. The transceiver 1608 is configured to transmit and receive signals for the communications device 1600 via an antenna 1610, such as the various signals as described herein. The network interface 1612 is configured to obtain and send signals for the communications device 1600 via communications link(s), such as a backhaul link, midhaul link, and/or fronthaul link as described herein, such as with respect to FIG. 2. The processing system 1602 may be configured to perform processing functions for the communications device 1600, including processing signals received and/or to be transmitted by the communications device 1600.

The processing system 1602 includes one or more processors 1620. In various aspects, one or more processors 1620 may be representative of one or more of receive processor 338, transmit processor 320, TX MIMO processor 330, and/or controller/processor 340, as described with respect to FIG. 3. The one or more processors 1620 are coupled to a computer-readable medium/memory 1630 via a bus 1606. In certain aspects, the computer-readable medium/ memory 1630 is configured to store instructions (e.g., computer-executable code), including code aspects 1630-1634, that when executed by the one or more processors 1620, cause the one or more processors 1620 to perform the method 1400 described with respect to FIG. 14, or any aspect related to it, including any additional steps or sub-steps described in relation to FIG. 14. Note that reference to a processor of communications device 1600 performing a function may include one or more processors of communications device 1600 performing that function, such as in a distributed fashion.

In the depicted example, the computer-readable medium/ memory 1630 stores code (e.g., executable instructions) for transmitting a synchronization signal 1631, code for transmitting a plurality of directional beams 1632, code for receiving a feedback signal 1633, and code for updating a beam codebook 1634. Processing of the code 1631-1634 may enable and cause the communications device 1600 to perform the method 1400 described with respect to FIG. 14, or any aspect related to it.

The one or more processors 1620 include circuitry configured to implement (e.g., execute) the code stored in the computer-readable medium/memory 1630, including circuitry for transmitting a synchronization signal 1621, circuitry for transmitting a plurality of directional beams 1622, circuitry for receiving a feedback signal 1623, and circuitry for updating a beam codebook 1624. Processing with circuitry 1621-1624 may enable and cause the communications device 1600 to perform the method 1400 as described with respect to FIG. 14, or any aspect related to it.

Various components of the communications device 1600 may provide means for performing the method 1400 as described with respect to FIG. 14, or any aspect related to it. Means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1608 and/or antenna 1610 of the communications device 1600 in FIG. 16, and/or one or more processors 1620 of the communications device 1600 in FIG. 16. Means for communicating, receiving or obtaining may include the transceivers 332, antenna(s) 334, receive processor 338, and/or controller/processor 340 of the BS 102 illustrated in FIG. 3, transceiver 1608 and/or antenna 1610 of the communications device 1600 in FIG. 16, and/or one or more processors 1620 of the communications device 1600 in FIG. 16. For example, means for the method 1400 described with respect to FIG. 14, or any aspect related to it, may include [insert means].

Example Clauses

Implementation examples are described in the following numbered clauses:

Clause 1: A method of wireless communications by an apparatus, comprising: receiving a synchronization signal, the synchronization signal including timing information associated with a directional beam sweep procedure, and power threshold information indicating beam power criteria evaluated during the directional beam sweep procedure; receiving, from the directional beam sweep, a first directional beam in accordance with the timing information, the first directional beam providing radio frequency energy for energy harvesting by the apparatus; measuring an amount of power associated with the first directional beam; comparing the measured amount of power to the power threshold information; and providing a feedback signal, wherein the feedback signal indicates whether the measured amount of power exceeds the power threshold information obtained from the synchronization signal.

Clause 2: The method according to Clause 1, further comprising: obtaining at least one power threshold level from the power threshold information included in the synchronization signal; and providing the feedback signal when the measured amount of power of the received first directional beam exceeds the at least one power threshold level.

Clause 3: The method according to any one of Clauses 1-2, further comprising: obtaining at least one frequency offset from the synchronization signal; receiving the directional beam at an initial frequency; obtaining at least one frequency offset from the synchronization signal; and providing the feedback signal at a feedback frequency that is different from the initial frequency, wherein the feedback frequency is based on the at least one frequency offset obtained from the synchronization signal.

Clause 4: The method according to Clauses 3, further comprising: obtaining at least one power threshold level from the power threshold information included in the synchronization signal; comparing the measured amount of power to the at least one power threshold level; and obtaining the at least one frequency offset based on the measured amount of power exceeding the at least one power threshold level.

Clause 5: The method according to any one of Clauses 1-4, further comprising providing the feedback signal as a backscattered response based on the first directional beam.

Clause 6: The method according to any one of Clauses 1-5, further comprising: receiving a second directional beam from the beam sweep in accordance with the timing information, the second directional beam providing radio frequency energy for energy harvesting by the apparatus; measuring an amount of power associated with the second directional beam; comparing the measured amount of power associated with the second directional beam to the power threshold information included in the synchronization signal; and providing a second feedback, wherein the second feedback signal indicates whether the measured amount of power associated with the second directional beam exceeds the power threshold information obtained from the synchronization signal.

Clause 7: The method according to any one of Clauses 1-6, further comprising: receiving a subsequent second directional beam from the beam sweep in accordance with the timing information, the second directional beam providing radio frequency energy for energy harvesting by the apparatus; measuring an amount of power associated with the second directional beam; comparing the measured amount of power associated with the second directional beam to the amount of power associated with a previously received directional beam that is different from the first directional beam; and providing the feedback signal for the directional beam having a greatest measured amount of power.

Clause 8: The method according to any one of Clauses 1-7, wherein the synchronization signal comprises frequency shift information, and the method further comprises providing the feedback signal at a frequency shifted from the first directional beam based at least in part on the frequency shift information.

Clause 9: The method according to any one of Clauses 1-8, wherein the one or more processors are configured to cause the apparatus to transmit the feedback signal to a network entity using a random access channel (RACH) procedure.

Clause 10: The method according to any one of Clauses 1-9, further comprising: receiving a request for identification information from a network entity following receipt of the feedback signal; and transmitting the identification information to the network entity in response to the request.

Clause 11: The method according to any one of Clauses 1-10, wherein the one or more processors are configured to cause the apparatus to utilize at least one of a received signal strength indicator (RSSI) or a reference signal received power (RSRP).

Clause 12: The method according to any one of Clauses 1-11, further comprising: receiving the synchronization signal in a first frequency band; and receiving the first directional beam in a second frequency band, the second frequency band being lower than the first frequency band.

Clause 13: The method according to any one of Clauses 1-12, further comprising harvesting energy from the first directional beam.

Clause 14: The method according to any one of Clauses 1-13, further comprising: determining a beam index associated with the first directional beam; and including the beam index in the feedback signal provided to a network entity.

Clause 15: The method according to any one of Clauses 1-14, where the directional beam sweep comprises a plurality of beam sweep operations over time, and the synchronization signal provides a periodicity of the plurality of beam sweep operations.

Clause 16: The method according to any one of Clauses 1-15, further comprising receiving a second synchronization signal that indicates an updated number of beams associated with another directional beam sweep.

Clause 17: The method according to any one of Clauses 1-16, further comprising measuring the amount of power associated with the first directional beam using a power harvester circuit of the apparatus.

Clause 18: A method of wireless communications by an network entity, comprising: transmitting a synchronization signal, the synchronization signal including timing information associated with a directional beam sweep procedure, and power threshold information indicating beam power criteria evaluated during the directional beam sweep procedure; transmitting a plurality of directional beams in accordance with the timing information, each directional beam of the plurality of directional beams associated with a beam index and configured to provide radio frequency energy for energy harvesting; receiving a feedback signal from a user equipment (UE) in response to at least one of the plurality of directional beams; and updating a beam codebook based at least in part on the feedback signal received from the UE.

Clause 19: A method according to Clause 18, wherein the synchronization signal comprises frequency shift information, and the method further comprises receiving the feedback signal at a frequency shifted from the at least one of the plurality of directional beams based at least in part on the frequency shift information.

Clause 20: A method according to any one of Clauses 18-19, further comprising: receiving the feedback signal via a random access channel procedure.

Clause 21: A method according to any one of Clauses 18-20, wherein the feedback signal includes a beam index associated with the at least one of the plurality of directional beams.

Clause 22: A method according to any one of Clauses 18-21, further comprising transmitting the synchronization signal in a first frequency band and transmit the plurality of directional beams in a second frequency band.

Clause 23: A method according to any one of Clauses 18-22, further comprising adjusting a beam width associated with the at least one of the plurality of directional beams based at least in part on the feedback signal.

Clause 24: A method according to any one of Clauses 18-23, wherein the feedback signal indicates an amount of power measured by the UE for the at least one of the plurality of directional beams.

Clause 25: A method according to any one of Clauses 18-24, further comprising updating the beam codebook based on comparing an amount of power measured for the at least one of the plurality of directional beams by the UE to the power threshold information.

Clause 26: A method according to any one of Clauses 18-25, further comprising transmitting wireless power to the UE via a directional beam in accordance with the updated beam codebook.

Clause 27: A method according to any one of Clauses 18-26, wherein the power threshold information indicates one or more power thresholds for comparison with measured power by the UE.

Clause 28: A method according to any one of Clauses 18-27, wherein the feedback signal comprises a backscattered modulation of the at least one of the plurality of directional beams.

Clause 29: One or more apparatuses, comprising: one or more memories comprising executable instructions; and one or more processors configured to execute the executable instructions and cause the one or more apparatuses to perform a method in accordance with any one of clauses 1-28.

Clause 30: One or more apparatuses, comprising means for performing a method in accordance with any one of clauses 1-28.

Clause 31: One or more non-transitory computer-readable media comprising executable instructions that, when executed by one or more processors of one or more apparatuses, cause the one or more apparatuses to perform a method in accordance with any one of clauses 1-28.

Clause 32: One or more computer program products embodied on one or more computer-readable storage media comprising code for performing a method in accordance with any one of clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor." "a controller." "a memory." "a transceiver." "an antenna," "the processor." "the controller." "the memory." "the transceiver." "the antenna." etc.), unless otherwise specifically stated, should be understood to refer to one or more elements (e.g., "one or more processors." "one or more controllers." "one or more memories," "one more transceivers." etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. A apparatus configured for wireless communications, comprising:
one or more memories; and
one or more processors coupled to the one or more memories configured to cause the apparatus to:
receive a synchronization signal, the synchronization signal including timing information associated with a directional beam sweep procedure, and power threshold information indicating beam power criteria evaluated during the directional beam sweep procedure;
receive, from the directional beam sweep, a first directional beam in accordance with the timing information, the first directional beam providing radio frequency energy for energy harvesting by the apparatus;
measure an amount of power associated with the first directional beam;
compare the measured amount of power to the power threshold information; and provide a feedback signal, wherein the feedback signal indicates whether the measured amount of power exceeds the power threshold information obtained from the synchronization signal.

2. The apparatus of claim 1, wherein the one or more processors are configured to cause the apparatus to:
obtain at least one power threshold level from the power threshold information included in the synchronization signal; and
provide the feedback signal when the measured amount of power of the received first directional beam exceeds the at least one power threshold level.

3. The apparatus of claim 1, wherein the one or more processors are configured to cause the apparatus to:
obtain at least one frequency offset from the synchronization signal;
receive the directional beam at an initial frequency;
obtain at least one frequency offset from the synchronization signal; and
provide the feedback signal at a feedback frequency that is different from the initial frequency,
wherein the feedback frequency is based on the at least one frequency offset obtained from the synchronization signal.

4. The apparatus of claim 3, wherein the one or more processors are configured to cause the apparatus to:
obtain at least one power threshold level from the power threshold information included in the synchronization signal;
compare the measured amount of power to the at least one power threshold level; and
obtain the at least one frequency offset based on the measured amount of power exceeding the at least one power threshold level.

5. The apparatus of claim 1, wherein the one or more processors are configured to cause the apparatus to provide the feedback signal as a backscattered response based on the first directional beam.

6. The apparatus of claim 1, wherein the one or more processors are configured to cause the apparatus to:
receive a second directional beam from the beam sweep in accordance with the timing information, the second directional beam providing radio frequency energy for energy harvesting by the apparatus;
measure an amount of power associated with the second directional beam;
compare the measured amount of power associated with the second directional beam to the power threshold information included in the synchronization signal; and
provide a second feedback signal, wherein the second feedback signal indicates whether the measured amount of power associated with the second directional beam exceeds the power threshold information obtained from the synchronization signal.

7. The apparatus of claim 1, wherein the one or more processors are configured to cause the apparatus to:
receive a subsequent second directional beam from the beam sweep in accordance with the timing information, the second directional beam providing radio frequency energy for energy harvesting by the apparatus;
measure an amount of power associated with the second directional beam;
compare the measured amount of power associated with the second directional beam to the amount of power associated with a previously received directional beam that is different from the first directional beam; and provide the feedback signal for the directional beam having a greatest measured amount of power.

8. The apparatus of claim 1, wherein:

the synchronization signal comprises frequency shift information, and the one or more processors are configured to cause the apparatus to provide the feedback signal at a frequency shifted from the first directional beam based at least in part on the frequency shift information.

9. The apparatus of claim 1, wherein the one or more processors are configured to cause the apparatus to transmit the feedback signal to a network entity using a random access channel (RACH) procedure.

10. The apparatus of claim 1, wherein the one or more processors are configured to cause the apparatus to:

receive a request for identification information from a network entity following receipt of the feedback signal; and transmit the identification information to the network entity in response to the request.

11. The apparatus of claim 1, wherein the one or more processors are configured to cause the apparatus to utilize at least one of a received signal strength indicator (RSSI) or a reference signal received power (RSRP).

12. The apparatus of claim 1, wherein the one or more processors are configured to:

receive the synchronization signal in a first frequency band; and receive the first directional beam in a second frequency band, the second frequency band being lower than the first frequency band.

13. The apparatus of claim 1, wherein the one or more processors are configured to cause the apparatus to harvest energy from the first directional beam.

14. The apparatus of claim 1, wherein the one or more processors are configured to cause the apparatus to:

determine a beam index associated with the first directional beam; and include the beam index in the feedback signal provided to a network entity.

15. The apparatus of claim 1, wherein:

the directional beam sweep comprises a plurality of beam sweep operations over time, and the synchronization signal provides a periodicity of the plurality of beam sweep operations.

16. The apparatus of claim 1, wherein the one or more processors are configured to cause the apparatus to receive a second synchronization signal that indicates an updated number of beams associated with another directional beam sweep.

17. The apparatus of claim 1, wherein the one or more processors are configured to cause the apparatus to measure the amount of power associated with the first directional beam using a power harvester circuit of the apparatus.

18. An apparatus for wireless communication, comprising:

one or more memories; and one or more processors coupled to the one or more memories configured to cause the apparatus to:

transmit a synchronization signal, the synchronization signal including timing information associated with a directional beam sweep procedure, and power threshold information indicating beam power criteria evaluated during the directional beam sweep procedure;

transmit a plurality of directional beams in accordance with the timing information, each directional beam of the plurality of directional beams associated with a beam index and configured to provide radio frequency energy for energy harvesting;

receive a feedback signal from a user equipment (UE) in response to at least one of the plurality of directional beams; and update a beam codebook based at least in part on the feedback signal received from the UE.

19. The apparatus of claim 18, wherein the synchronization signal comprises frequency shift information, and the one or more processors are configured to cause the apparatus to receive the feedback signal at a frequency shifted from the at least one of the plurality of directional beams based at least in part on the frequency shift information.

20. The apparatus of claim 18, wherein the one or more processors are configured to cause the apparatus to receive the feedback signal via a random access channel procedure.

21. The apparatus of claim 18, wherein the feedback signal includes a beam index associated with the at least one of the plurality of directional beams.

22. The apparatus of claim 18, wherein the one or more processors are configured to cause the apparatus to transmit the synchronization signal in a first frequency band and transmit the plurality of directional beams in a second frequency band.

23. The apparatus of claim 18, wherein the one or more processors are configured to cause the apparatus to adjust a beam width associated with the at least one of the plurality of directional beams based at least in part on the feedback signal.

24. The apparatus of claim 18, wherein the feedback signal indicates an amount of power measured by the UE for the at least one of the plurality of directional beams.

25. The apparatus of claim 24, wherein the one or more processors are configured to cause the apparatus to update the beam codebook based on comparing an amount of power measured for the at least one of the plurality of directional beams by the UE to the power threshold information.

26. The apparatus of claim 18, wherein the one or more processors are configured to cause the apparatus to transmit wireless power to the UE via a directional beam in accordance with the updated beam codebook.

27. The apparatus of claim 18, wherein the power threshold information indicates one or more power thresholds for comparison with measured power by the UE.

28. The apparatus of claim 18, wherein the feedback signal comprises a backscattered modulation of the at least one of the plurality of directional beams.

29. A method of wireless communications by an apparatus, comprising:

receiving a synchronization signal, the synchronization signal including timing information associated with a directional beam sweep procedure, and power threshold information indicating beam power criteria evaluated during the directional beam sweep procedure;

receiving, from the directional beam sweep, a first directional beam in accordance with the timing information, the first directional beam providing radio frequency energy for energy harvesting by the apparatus;

measuring an amount of power associated with the first directional beam;

comparing the measured amount of power to the power threshold information; and providing a feedback signal, wherein the feedback signal indicates whether the measured amount of power exceeds the power threshold information obtained from the synchronization signal.

30. A method of wireless communications by an network entity, comprising:

transmitting a synchronization signal, the synchronization signal including timing information associated with a directional beam sweep procedure, and power threshold information indicating beam power criteria evaluated during the directional beam sweep procedure;

transmitting a plurality of directional beams in accordance with the timing information, each directional beam of the plurality of directional beams associated with a beam index and configured to provide radio frequency energy for energy harvesting;

receiving a feedback signal from a user equipment (UE) in response to at least one of the plurality of directional beams; and updating a beam codebook based at least in part on the feedback signal received from the UE.

\* \* \* \* \*